(12) United States Patent
Ando

(10) Patent No.: US 9,792,159 B2
(45) Date of Patent: *Oct. 17, 2017

(54) PROGRAM DETERMINING APPARATUS AND PROGRAM DETERMINING METHOD

(71) Applicant: RICOH COMPANY, LTD., Tokyo (JP)

(72) Inventor: Mitsuo Ando, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/658,350

(22) Filed: Mar. 16, 2015

(65) Prior Publication Data

US 2015/0186188 A1 Jul. 2, 2015

Related U.S. Application Data

(63) Continuation of application No. 12/167,631, filed on Jul. 3, 2008, now Pat. No. 9,003,394.

(30) Foreign Application Priority Data

Jul. 10, 2007 (JP) .................................. 2007-181345
Apr. 4, 2008 (JP) .................................. 2008-098627

(51) Int. Cl.
*G06F 9/46* (2006.01)
*G06F 9/50* (2006.01)
(Continued)

(52) U.S. Cl.
CPC .............. *G06F 9/5083* (2013.01); *G06F 8/61* (2013.01); *G06F 9/44505* (2013.01); *G06F 9/54* (2013.01)

(58) Field of Classification Search
CPC ...... G06F 8/61; G06F 9/44505; G06F 9/5083; G06F 9/54
(Continued)

(56) References Cited

U.S. PATENT DOCUMENTS 5,948,065 A * 9/1999 Eilert ..................... G06F 9/4881
                                                    709/201
6,874,145 B1 * 3/2005 Ye ......................... G06F 9/44557
                                                    348/E5.006
(Continued)

FOREIGN PATENT DOCUMENTS

EP         0 578 264 A2    1/1994
JP         57-19852        2/1982
(Continued)

OTHER PUBLICATIONS

JP 2006285871 A (Machine Translation of Spec. and Abstract) A (Machine Translation of Spec. and Abstract).*
(Continued)

*Primary Examiner* — Benjamin Wu
*Assistant Examiner* — Willy W Huaracha
(74) *Attorney, Agent, or Firm* — Oblon, McClelland, Maier & Neustadt, L.L.P.

(57) ABSTRACT

A disclosed program determining apparatus includes a log recording unit configured to record, in response to at least one of a use request for use of a predetermined function of the image forming apparatus from a program for use in the image forming apparatus and consumption of a predetermined resource of the image forming apparatus by the program, content of said at least one of use request and consumption as log information; and a determining unit configured to determine whether said at least one of use of the predetermined function requested by the program and consumption of the predetermined resource by the program satisfies a predetermined restriction.

13 Claims, 24 Drawing Sheets

(51) Int. Cl.
*G06F 9/445* (2006.01)
*G06F 9/54* (2006.01)

(58) Field of Classification Search
USPC .......................................................... 718/100
See application file for complete search history.

(56) References Cited

U.S. PATENT DOCUMENTS

| | | | |
|---|---|---|---|
| 7,607,131 B2 | 10/2009 | Oe et al. | |
| 7,702,779 B1 | 4/2010 | Gupta et al. | |
| 7,934,111 B2 | 4/2011 | Yamaji | |
| 8,527,984 B2 | 9/2013 | Ikeda | |
| 8,959,515 B2* | 2/2015 | Qin | G06F 9/4881 709/223 |
| 2003/0217065 A1* | 11/2003 | Yokota | G06F 11/1433 |
| 2004/0109188 A1* | 6/2004 | Akiyoshi | G06F 8/60 358/1.13 |
| 2005/0015668 A1 | 1/2005 | Doyle et al. | |
| 2005/0038996 A1 | 2/2005 | Meyerson | |
| 2006/0050304 A1 | 3/2006 | Abe et al. | |
| 2006/0085787 A1* | 4/2006 | Breslaw | G06F 9/485 718/100 |
| 2006/0206929 A1 | 9/2006 | Taniguchi et al. | |
| 2007/0044098 A1 | 2/2007 | Ishimura et al. | |
| 2007/0121161 A1* | 5/2007 | Yamada | H04N 1/00954 358/1.16 |
| 2007/0294691 A1* | 12/2007 | Park | G06F 9/445 718/100 |
| 2008/0098389 A1* | 4/2008 | Akiyoshi | G06F 8/60 717/175 |
| 2008/0155092 A1 | 6/2008 | Kumar et al. | |
| 2009/0144756 A1 | 6/2009 | Inami | |
| 2010/0122247 A1* | 5/2010 | Ikeda | G06F 8/61 717/174 |
| 2011/0072481 A1* | 3/2011 | Chen | G06F 8/62 725/116 |
| 2014/0108762 A1 | 4/2014 | Fujisawa | |

FOREIGN PATENT DOCUMENTS

| | | |
|---|---|---|
| JP | 5-257723 | 10/1993 |
| JP | 5-257758 | 10/1993 |
| JP | 7-253909 | 10/1995 |
| JP | 2000-285010 A | 10/2000 |
| JP | 2001-195247 | 7/2001 |
| JP | 2003-6002 | 1/2003 |
| JP | 2003-228493 | 8/2003 |
| JP | 2004-122773 | 4/2004 |
| JP | 2004-129246 | 4/2004 |
| JP | 2005-235087 | 9/2005 |
| JP | 2005-269619 | 9/2005 |
| JP | 2005-301969 | 10/2005 |
| JP | 2006-259886 A | 9/2006 |
| JP | 2006-285871 | 10/2006 |
| JP | 2006-293974 | 10/2006 |
| JP | 2006285871 A * | 10/2006 |
| JP | 2007-48310 | 2/2007 |
| JP | 2007-052691 | 3/2007 |
| JP | 2007-108804 | 4/2007 |
| WO | WO 2007/020735 A1 | 2/2007 |

OTHER PUBLICATIONS

Japanese Office Action issued Jan. 18, 2011, in Patent Application No. 2008-098627.
Japanese Office Action issued Jan. 18, 2011, in Patent Application No. 2008-102324.
Office Action issued Oct. 4, 2011, in Japanese Patent Application No. 2008-098627.
Office Action issued Oct. 4, 2011, in Japanese Patent Application No. 2008-102324.
Japanese Office Action dated Aug. 13, 2013, issued in JP 2012-090177.
Office Action issued Feb. 4, 2014, in Japanese Patent Application No. 2012-090177.

* cited by examiner

FIG.8

```
<?xml version="1.0" encoding="UTF-8"?>
<dalp dsdk="">                                                    411
    <information>
        <product-id>11030200</product-id>  ～4111
        <title>ScanApp</title>  ～4112
        <vendor>RRR Fukuoka</vendor>  ～4113
        <abbreviation>Scan</abbreviation>
        <description>Scan2xxx</description>
        <offline-allowed/>
    </information>
    <resources>                                                   412
        <jar href="./ScanApp.jar"/>  ～4121
    </resources>
    <pseudo-boot trigger=install platform=same>                   413
                  ～4131        ～4132
        <pb href="./ScanApp.pb"/>～4133
    </pseudo-boot>
    <xlet-desc xlet-class="ScanApp" visible="true">               414
                                    ～4141
    </xlet-desc>
</dalp>
```

```
boolean pbCase1(){
  pbRun("ScanApp.s" , "ScanApp.b");         ~711
  PseudoBootLog log = getLog( ScanApp );    ~712
  if ( log.Maxmem ≦ 5MB && log.NotAccessHdd && log.ScanMode == Mono){  ~713
    return true;   ~714
  }
  return false;    ~715
}
```

FIG.10

```
setUp(){
  Button start = (Button)NameComponetFinder( RootWindow , Button.class , "Start" );   ~721
  RootWindow.setWait(3);   ~722
  start.click();   ~723
  Label result =(Button)NameComponetFinder( RootWindow , Label.class , "Result" );   ~724
  Label.flushWait();   ~725
  if ( result.str == "Complete" ){   ~726
    return True;   ~727
  }
  return False;   ~728
}
```

FIG.12

```
setup(){
    Scan(NoError);      ─── 731
    Panel(NoError);     ─── 732
}
```
73

FIG.14

```
0001,2007.05.10,11:30:24:01,ScanApp,Bundle,initState
0002,2007.05.10,11:30:24:01,ScanApp,Bundle,activeState
0003,2007.05.10,11:30:24:01,ScanApp,Memory,Heap=2MB,Stack=100KB, Object,ScanService=1MB
0004,2007.05.10,11:30:25:01,ScanApp,Scan,setup,attribute,mono
0005,2007.05.10,11:30:24:01,ScanApp,Memory,Heap=3MB,Stack=300KB, Object,PanelService=1MB
0006,2007.05.10,11:30:25:01,ScanApp,Panel,show
0007,2007.05.10,11:30:25:04,ScanApp,Scan,start
0008,2007.05.10,11:30:25:05,ScanApp,Scan,complete
0009,2007.05.10,11:30:25:05,ScanApp,Panel,show
0010,2007.05.10,11:30:25:05,ScanApp,Bundle,destroyState
```
80

FIG.19

```
boolean pbCase1(PseudoBootLog log ){ ~~716
    pbRun("ScanApp.s" , "ScanApp.b" ); ~~711
    log = getLog( ScanApp ); ~~712
    if ( log.Maxmem≦ 5MB && log.NotAccessHdd && log.ScanMode == Mono){ ~~713
        return true; ~~714
    }
    return false; ~~715
}
```
~71a

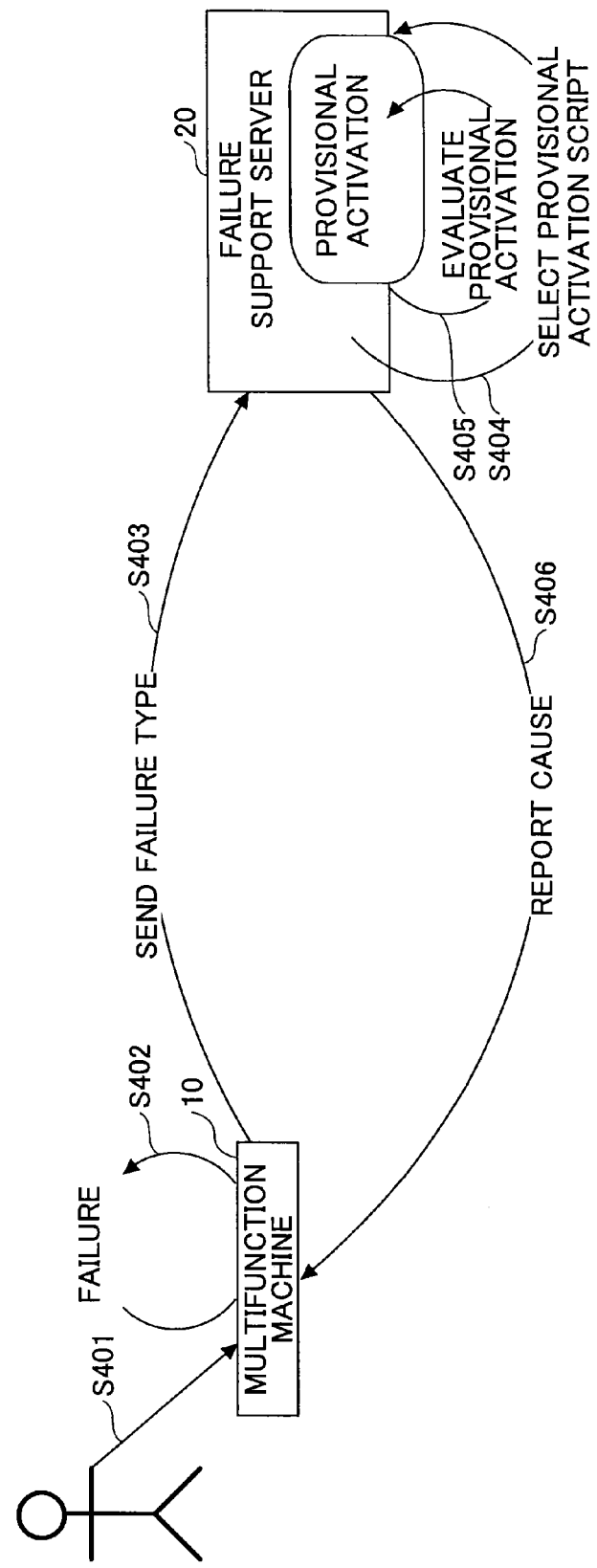

PROGRAM DETERMINING APPARATUS AND PROGRAM DETERMINING METHOD

CROSS-REFERENCE TO RELATED APPLICATIONS

The present application is a continuation application of and claims the benefit of priority under 35 U.S.C. §120 from U.S. application Ser. No. 12/167,631, filed Jul. 3, 2008, which is based upon and claims the benefit of priority under 35 U.S.C. §119 from Japanese Priority Application No. 2007-181345 filed on Jul. 10, 2007, and Japanese Priority Application No. 2008-098627 filed on Apr. 4, 2008, with the Japanese Patent Office, the entire contents of each of which is hereby incorporated herein by reference.

FIELD OF THE INVENTION

The present invention generally relates to a program determining apparatus and a program determining method, and particularly relates to a program determining apparatus configured to determine a program for an image forming apparatus and a program determining method of determining a program for an image processing apparatus.

DESCRIPTION OF THE RELATED ART

In these years, some of image forming apparatuses called multifunction machines or compound machines can, after their shipment, have developed and installed new applications using published APIs (Application Programming Interfaces) (see, for example, Japanese Patent Laid-Open Publication No. 2005-269619). In such an image forming apparatus, not only applications developed by a vendor of the image forming apparatus, but also applications developed by other software vendors may be installed and used.

The resource usage restrictions imposed on built-in type devices such as these image forming apparatuses are stricter than the resource usage restrictions imposed on general purpose computers. Therefore, the restrictions on the resource usage such as memory consumption of applications are previously determined, and the software vendors are required to design applications that can operate within such restrictions (hereinafter referred to as "resource restrictions").

Meanwhile, the software vendors wish to provide more useful and higher performance applications. Generally, the higher the performance of programs, the higher the memory usage of the programs. If the software vendors place too much focus on the usability for end users, applications not satisfying the resource restrictions might be put on the market.

In the case where plural applications are used in parallel, even if each of the applications satisfies the resource restrictions, the resources of the image forming apparatuses might run out depending on the way users use the applications.

If the resources are used up, the applications are not guaranteed to operate correctly, which results in inconvenience for end users. Furthermore, the vendors of the image forming apparatuses and the vendors who have developed the applications need to investigate the cause of malfunction.

SUMMARY OF THE INVENTION

In view of the forgoing, the present invention is directed to provide a program determining apparatus, a program determining method, and a computer readable recording medium storing a program determining program that can reduce the risk of an image forming apparatus malfunctioning due to a program.

In an embodiment of the present invention, there is provided a program determining apparatus that comprises a log recording unit configured to record, in response to at least one of a use request for use of a predetermined function of the image forming apparatus from a program for use in the image forming apparatus and consumption of a predetermined resource of the image forming apparatus by the program, content of said at least one of use request and consumption as log information; and a determining unit configured to determine whether said at least one of use of the predetermined function requested by the program and consumption of the predetermined resource by the program satisfies a predetermined restriction.

This program determining apparatus can reduced the risk of the image forming apparatus malfunctioning due to the program.

In another embodiment of the present invention, there is provided a program determining method executable by a computer. The method comprises a log recording step of recording, in response to at least one of a use request for use of a predetermined function of the image forming apparatus from a program for use in the image forming apparatus and consumption of a predetermined resource of the image forming apparatus by the program, content of said at least one of use request and consumption as log information; and a determining step of determining whether said at least one of use of the predetermined function requested by the program and consumption of the predetermined resource by the program satisfies a predetermined restriction.

According to an aspect of the present invention, it is possible to provide a program determining apparatus, a program determining method, and a computer readable recording medium storing a program determining program that can reduce the risk of an image forming apparatus malfunctioning due to a program.

BRIEF DESCRIPTION OF THE DRAWINGS

FIG. 8 is a diagram illustrating an example of application information stored in an application management file of a scan application;

FIG. 9 is a diagram illustrating an example of descriptions of a main script according to the first embodiment;

FIG. 10 is a diagram illustrating an example of descriptions of a scenario script according to the first embodiment;

FIG. 12 is a diagram illustrating an example of descriptions of an action script according to the first embodiment of the present invention;

FIG. 14 is a diagram illustrating an example of a provisional activation log;

FIG. 19 is a diagram showing an example of descriptions of a main script according to a second embodiment;

FIG. 23 is a diagram illustrating a method of failure analysis using provisional activation according to a fourth embodiment.

DETAILED DESCRIPTION OF THE PREFERRED EMBODIMENT

Figure 1:
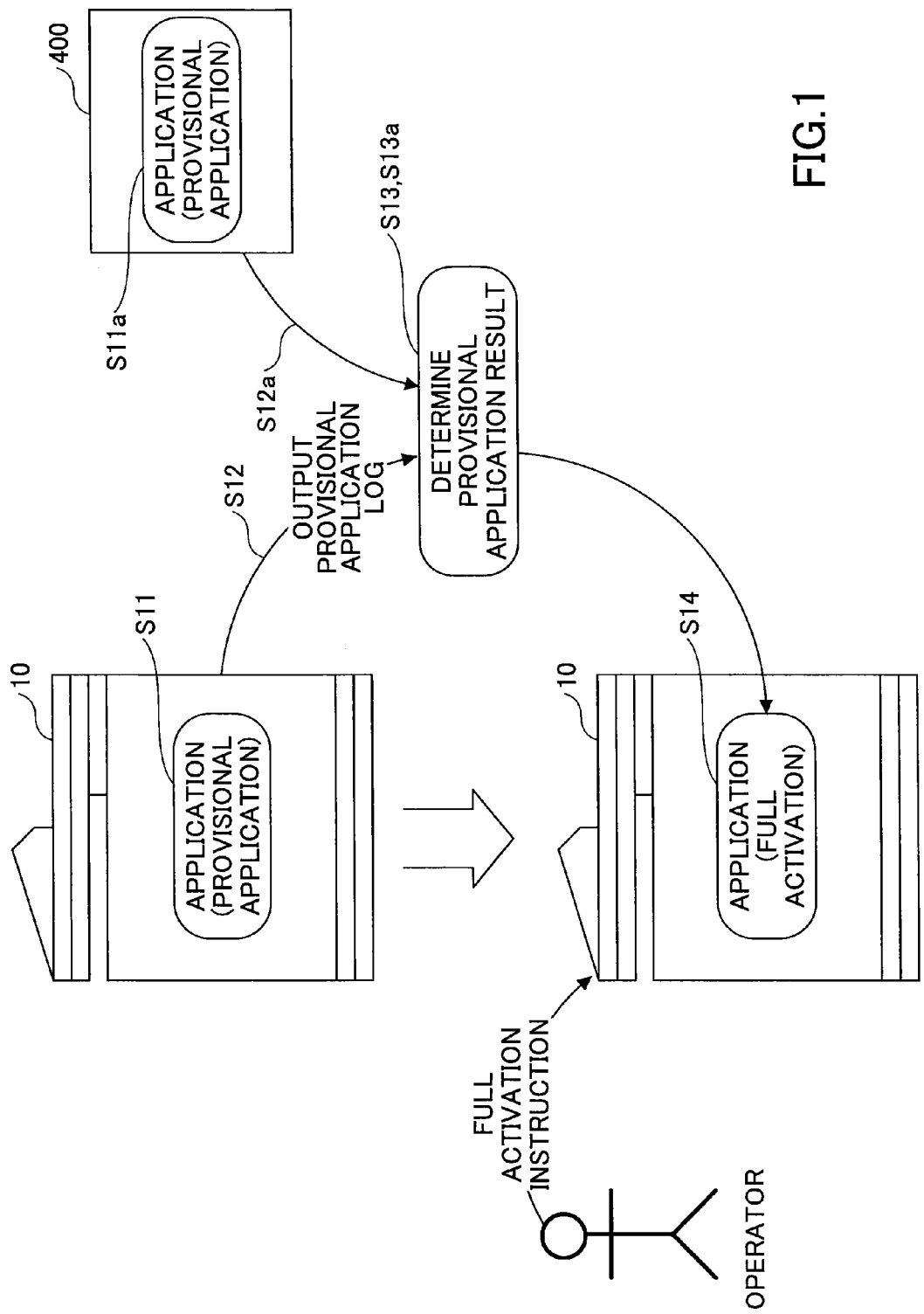
FIG. 1 is a diagram illustrating the overview of an embodiment of the present invention.

FIG. 1 is a diagram illustrating the overview of an embodiment of the present invention. According to this embodiment of the present invention, a multifunction machine 10 is an example of an image forming apparatus to which applications can be added. In FIG. 1, although two multifunction machines 10 are shown at the upper side and the lower side, they are the same multifunction machine 10 at different time points.

According to this embodiment, an application that is newly installed in the multifunction machine 10 is provisionally activated (Step S11). Provisional activation is to activate an application to determine the resource usage of the application and services (functions) of the multifunction machine 10 to be used by the application. Information indicating services of the multifunction machine 10 to be used by an application is hereinafter referred to as application operational information. In this embodiment, the provisionally activated application cannot provide regular functions of the application to users. During provisional activation, the multifunction machine 10 outputs application operational information as a provisional activation log (Step S12). After completion of the provisional activation, the multifunction machine 10 determines whether the provisional activation is successful based on the provisional activation log (Step S13). If the provisionally activated application is determined to operate within predetermined restrictions (restrictions on resource usage and services of the multifunction machine 10 to be used), the provisional activation is determined to be successful. If the provisionally activated application does not operate within the predetermined restrictions, the provisional activation is determined to have failed.

If the provisional activation is successful, the application is installed into the multifunction machine 10 and full activation of the application is allowed. Therefore, in response to an activation request from a user, the application is fully activated (Step S14). Full activation, an antonym of provisional activation, is to activate an application to provide regular functions of the application. That is, full activation allows normal use of the application. Upon and during full activating of the application, the multifunction machine 10 controls operations of the application based on the provisional activation log. For example, the multifunction machine 10 rejects activation of the application, limits the timing of activation of the application, controls a state transition of the application (the progress of a process), and restricts use of services of the multifunction machine 10 by the application.

As described above, the multifunction machine 10 provisionally activates an application to be newly added to (i.e., an application to be installed into) the multifunction machine 10 in advance and therefore can control operations of the application during full activation based on the provisional activation log acquired during the provisional activation. Accordingly, it is possible to limit operations of an application that does not satisfy predetermined restrictions on resources such as resource usage restrictions and can control timings of use of resources by individual applications that are activated concurrently (in parallel).

The provisional activation of an application does not need to be performed by the multifunction machine 10 in which the application is to be fully activated. For example, as shown in FIG. 1, provisional activation may be performed by a general purpose computer 400 (Step S11a). During provisional activation, the computer 400 outputs application operational information as a provisional activation log (Step S12a). After completion of the provisional activation, the computer 400 determines whether the provisional activation is successful based on the provisional activation log (Step S13a). If the provisional activation is successful, the application may be installed into the multifunction machine 10.

Figure 2:
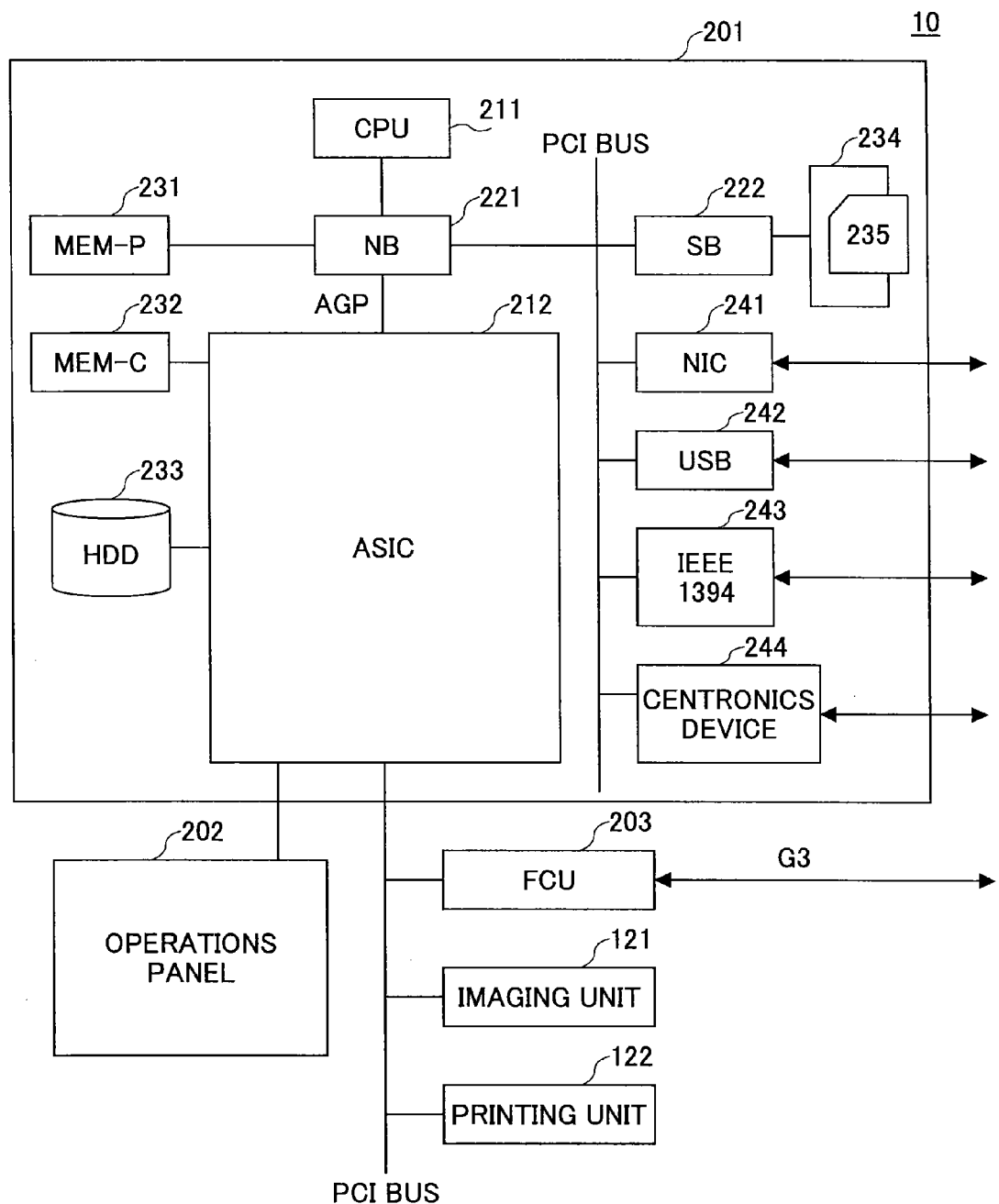
FIG. 2 is a block diagram illustrating an example of a hardware configuration of a multifunction machine according to an embodiment of the present invention.

A detailed description is given below. FIG. 2 is a diagram showing an example of a hardware configuration of the multifunction machine 10 according to this embodiment of the present invention. In FIG. 2, the multifunction machine 10 includes a controller 201, an operations panel 202, a facsimile control unit (FCU) 203, an imaging unit 121, and a printing unit 122.

The controller 201 includes a CPU 211, an ASIC 212, an NB 221, an SB 222, an MEM-P 231, an MEM-C 232, an HDD (hard-disk drive) 233, a memory card slot 234, an NIC (network interface controller) 241, a USB device 242, an IEEE 1394 device 243, and a Centronics device 244.

The CPU 211 is an IC for performing various types of information processing. The ASIC 212 is an IC for performing various types of image processing. The NB 221 is a north bridge of the controller 201. The SB 222 is a south bridge of the controller 201. The MEM-P 231 is a system memory of the multifunction machine 10. The MEM-C 232 is a local memory of the multifunction machine 10. The HDD 233 is a storage unit of the multifunction machine 10. The memory card slot 234 is a slot for a memory card 235. The NIC 241 is a controller for network communications based on MAC addresses. The USB device 242 serves to provide connection terminals conforming to the USB specification. The IEEE 1394 device 243 serves to provide connection terminals conforming to the IEEE 1394 specification. The Centronics device 244 serves to provide connection terminals conforming to the Centronics specification.

The operations panel 202 serves as a hardware unit (operations unit) by which an operator enters an input into the multifunction machine 10, and also serves as a hardware unit (display unit) through which an operator obtains an output of the multifunction machine 10.

Figure 3:
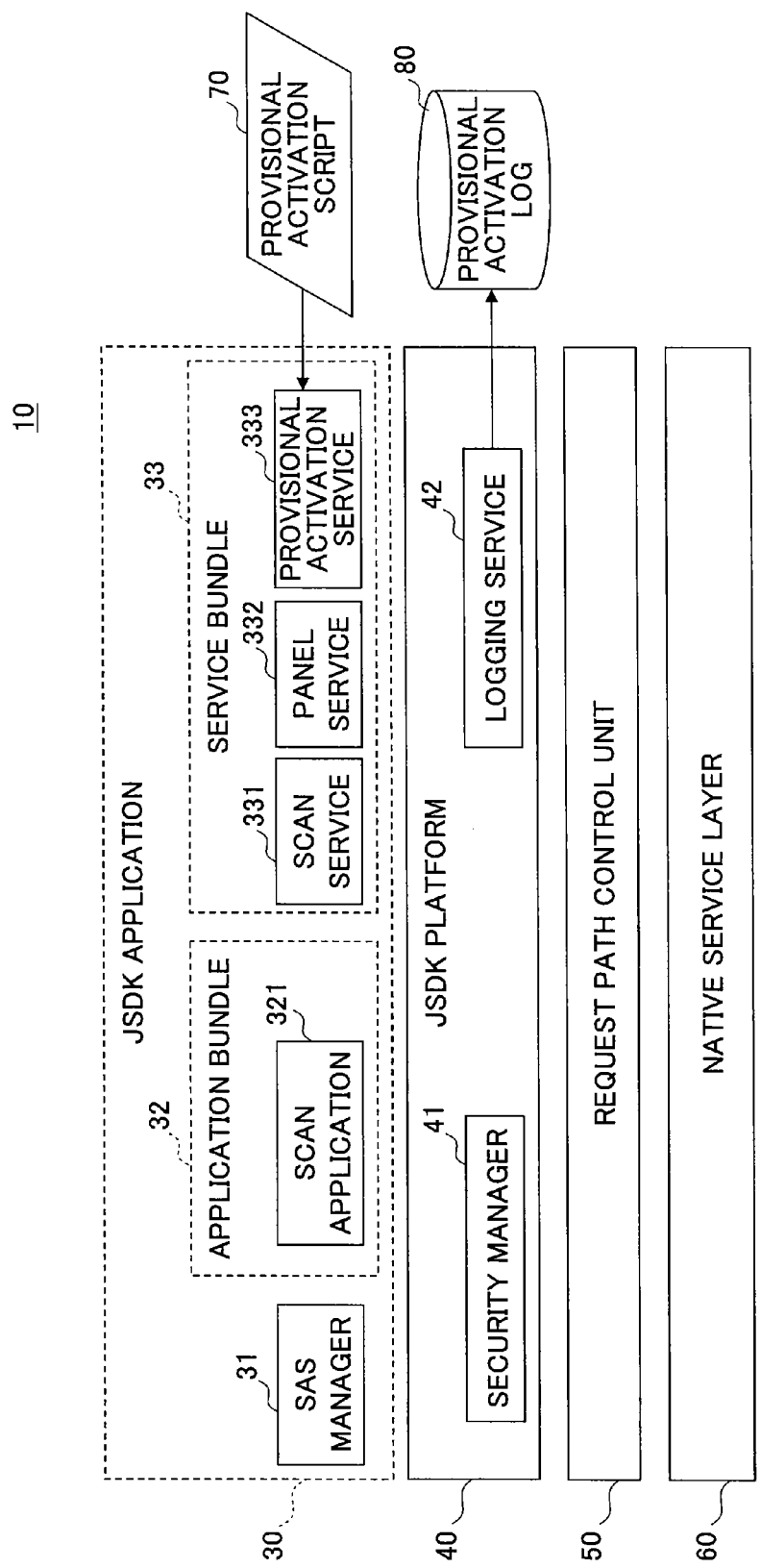
FIG. 3 is a block diagram illustrating an example of a software configuration of a multifunction machine according to an embodiment of the present invention.

FIG. 3 is a diagram showing an example of a software configuration of the multifunction machine 10 according to this embodiment of the present invention. In FIG. 3, the software includes a JSDK application 30, a JSDK platform 40, a request path control unit 50, and a native service layer 60. Programs stored in the memory card 235 and other storage units are processed by the CPU 211 so that these software components operate.

The native service layer 60 serves to provide an interface for using functions of the hardware and software of the multifunction machine 10 to higher modules and, in response to a call to the interface (a request for use of a function), performs controls for realizing the function. For example, the native service layer includes a module that provides an interface for controlling network communications, a module that provides an interface for controlling facsimile functions, a module that provides an interface for controlling transmission of stored documents (document (image) data stored in the HDD 233), an interface for controlling the imaging unit 121 and the printing unit 122, a module that provides an interface for controlling the memory (231 and 232) and the HDD 233, a module that provides an interface for controlling the operations panel 202, a module that provides an interface for controlling authentication and billing, and a module that provides an interface for managing user information.

The JSDK platform 40 is a software platform that provides an execution environment for the JSDK application 30, and provides a Java (registered trademark) interface to higher modules. The JSDK platform 40 includes standard Java classes, class libraries for classes extended for the multifunction machine 10, and a Java virtual machine. In FIG. 3, a security manager 41 and a logging service 42 are shown as examples of the components of the JSDK platform 40.

The security manager 41 restricts access by the JSDK application 30 to resources such as files, network sockets, and a printer according to access control information previously defined in a policy file. That is, the JSDK platform 40 is configured to place a call to the security manager 41 upon receiving a request for access to the resources. The security manager 41 determines whether to permit access to the resource in response to the call. In an alternative embodiment, the security manager 41 may be provided using a standard Java SecurityManager class.

The logging service 42 outputs a provisional activation log 80 during provisional activation of the JSDK application 30.

The JSDK platform 40 is implemented as an OSGi (Open Service Gateway initiative) platform. The OSGI platform is a standardized technology by the OSGi Alliance, and is a software platform that provides an execution environment for software components that are created using an open software component technology based on the Java language. Software written in the Java language is implemented on the OSGi platform in the form of a software component called a "bundle". A single JAR (Java Archive) forms a single bundle. Bundles can be installed independently and dynamically (without a need to restart the machine).

The JSDK application 30 is an application (hereinafter referred to as an "SDK application") that is developed using a dedicated SDK (software developing kit) disclosed in the JSDK platform. The SDK applications that are developed using the Java language are called JSDK applications. In this embodiment, provisional activation of JSDK applications is performed.

In FIG. 3, an SAS (SDK Application Service) manager 31, an application bundle 32, and a service bundle 33 are shown as examples of the JSDK application 30. The SAS Manager 31 controls installation (addition), uninstallation (deletion), activation, and termination of activation of the other JSDK applications (the application bundle 32 and the service bundle 33).

The application bundle 32 is a bundle of the JSDK application 30 that causes an operations screen to be displayed on the operations panel 202 and is directly used (operated) by an end user through the operations screen. In FIG. 3, a scan application 321 is shown as an example of the application bundle 32. The scan application 321 is configured to read an image of a document using the imaging unit 121.

The service bundle 33 is a bundle of the JSDK application 30 that provides services to the application bundle 32, etc. That is, the service bundle 33 executes operations corresponding to individual bundles in response to calls from the application bundle 32, etc., and transmits processing results to the application bundle 32, etc. In FIG. 3, a scan service 331, a panel service 332, and a provisional activation service 333 are shown as examples of the service bundle 33.

The scan service 331 provides a service related to an image reading function. The panel service 332 provides a service related to display control of the operations panel 202. The provisional activation service 333 provides a service for controlling provisional activation based on descriptions of a provisional activation script 70. The provisional activation script 70 is described below in greater detail.

In this embodiment, applications such as the application bundle 32 and the service bundle 33 operate according to a state transition model in which the state is shifted (i.e., the processing proceeds) from an init state, to a pause state, to an active state, and then to a destroy state. The init state is an initial state where initial processing is performed. The application first moves to the init state immediately after activation. The pause state is a waiting state. In the pause state, the application waits to be executable. The active state is a state where regular functions of the application are performed. The destroy state is a termination state. The application to be terminated moves to the destroy state, in which the application is terminated after performing termination processing (such as releasing the resources).

Figure 4:
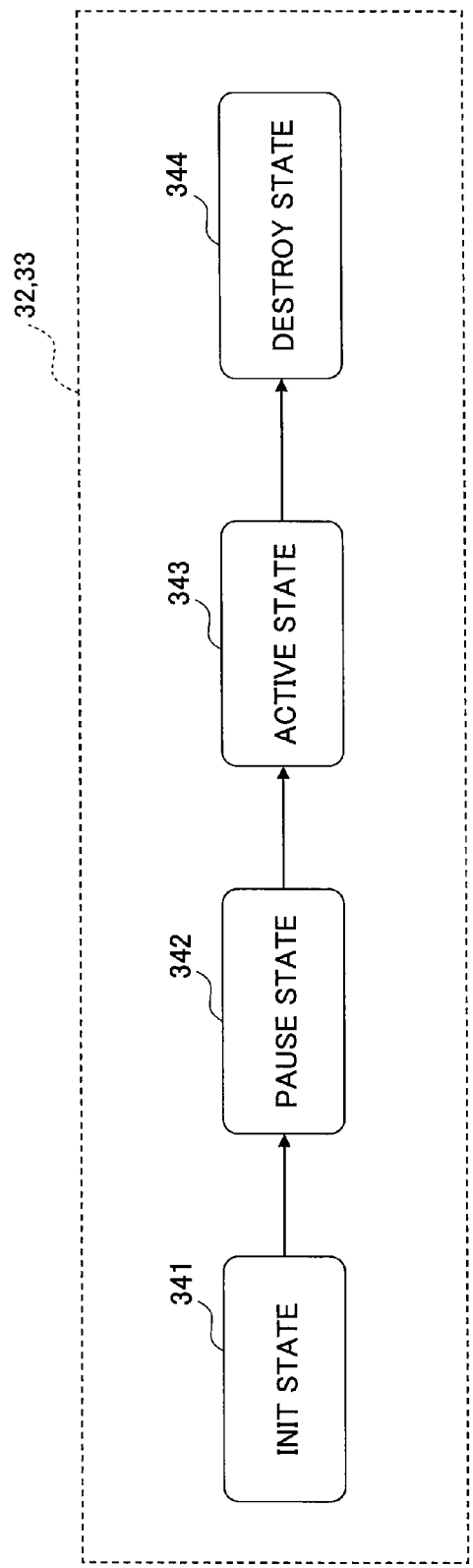
FIG. 4 is a diagram illustrating an implementation example of a state transition model of an application bundle and a service bundle.

The application bundle 32 and the service bundle 33 are configured as described below in order to realize such a state transition model. FIG. 4 is a diagram showing an implementation example of a state transition model of the application bundle 32 and the service bundle 33. As shown in FIG. 4, the application bundle 32 and the service bundle 33 (referred to as "application bundle 32, etc." in the following description in connection with FIG. 4) include an instantiated object corresponding to each state. That is, an init state object 341, a pause state object 342, an active state object 343, and a destroy state object 344 are instantiated corresponding to the init state, the pause state, the active state, and the destroy state, respectively.

In response to an event (message) that causes a state transition, the application bundle 32, etc., moves control of processing (control of the application) from the current object to the next object. For example, the processing control moves from the init state object 341 to the pause state object 342. Such a transition of control realizes a state transition.

Note that although the application bundle 32, etc., operates according to the state transition model, this does not mean that applications need to be implemented according to a certain state transition model in order to apply an embodiment of the present invention.

The request path control unit 50 monitors a request (request for use of a predetermined function) issued from the JSDK application 30 to the native service layer 60 and controls a transmission path of the request depending on whether the JSDK application 30 which issued the request is provisionally activated. If the JSDK application 30 is provisionally activated, the request is transmitted to the provisional activation service 333. If the JSDK application 30 is not provisionally activated (i.e., the JSDK application 30 is fully activated), the request is transmitted to the native service layer 60.

Figure 5:
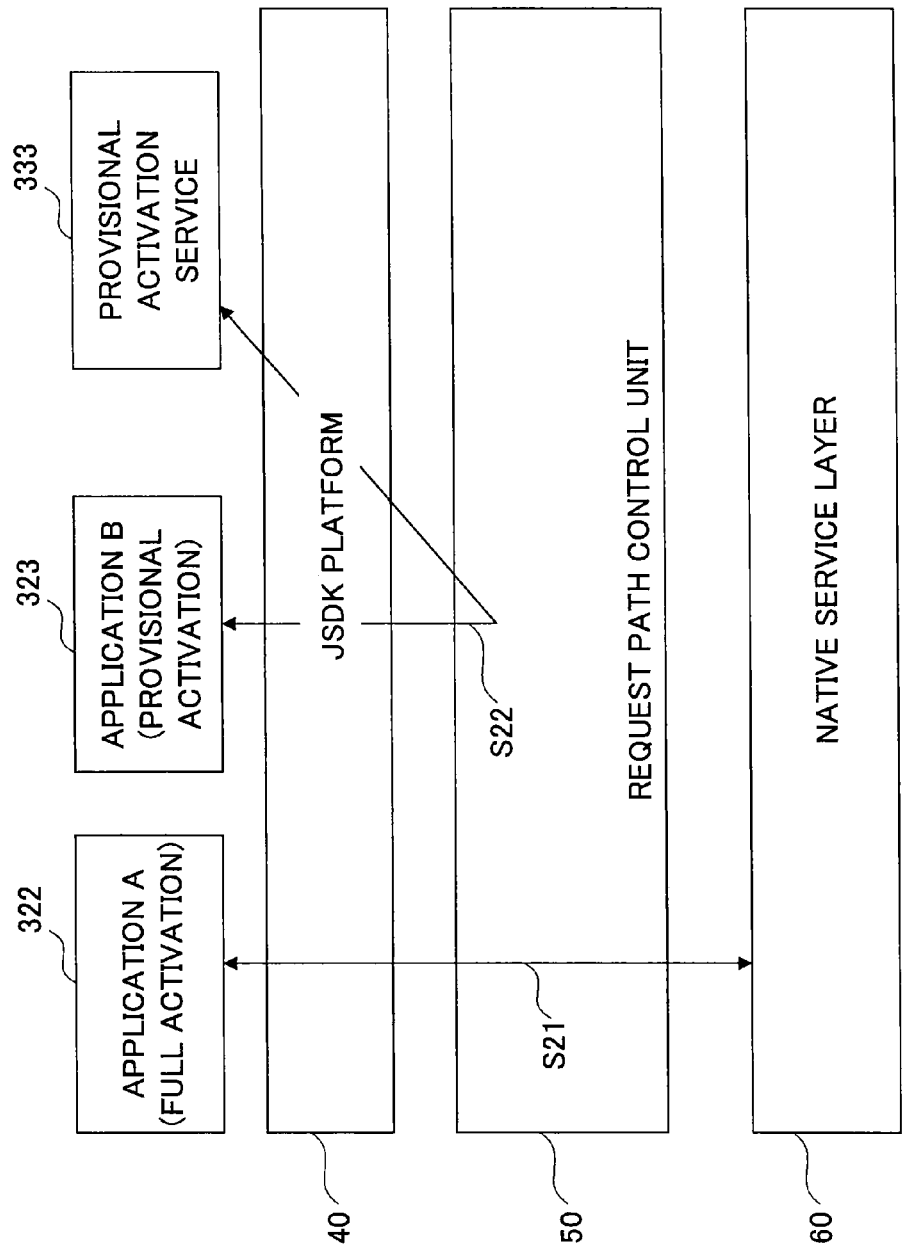
FIG. 5 is a block diagram illustrating functions of a request path control unit.

FIG. 5 is a block diagram illustrating functions of the request path control unit 50. In FIG. 5, the same elements as those shown in FIG. 3 are indicated by the same reference numerals. In FIG. 5, an application A 322 is a fully activated application bundle 32. An application B 323 is a provisionally activated application bundle 32. As shown in FIG. 5, the request path control unit 50 allows a call to the native service layer 60 sent from the fully activated application A 322 via the JSDK platform 40 to pass through (Step S21). In this case, the multifunction machine 10 actually operates under the control of the native service layer 60.

On the other hand, the request path control unit 50 transmits a call sent from the provisionally activated application B 323 via the JSDK platform 40 not to the native service layer 60 but to the provisional activation service 333 (Step S22). In this case, the provisional activation service 333 acts like the native service layer 60, and transmits a response indicating the result to the application B 323 in the same form as the form used by the native service layer 60. Therefore, it appears to the application B 323 that the native service layer 60 has been successfully called and the function has been performed. In this way, during provisional activation, the request path control unit 50 prevents the native service layer 60 and its lower components from functioning (i.e., prevents the multifunction machine 10 from actually operating) so that the JSDK application 30 is examined.

Figure 6:
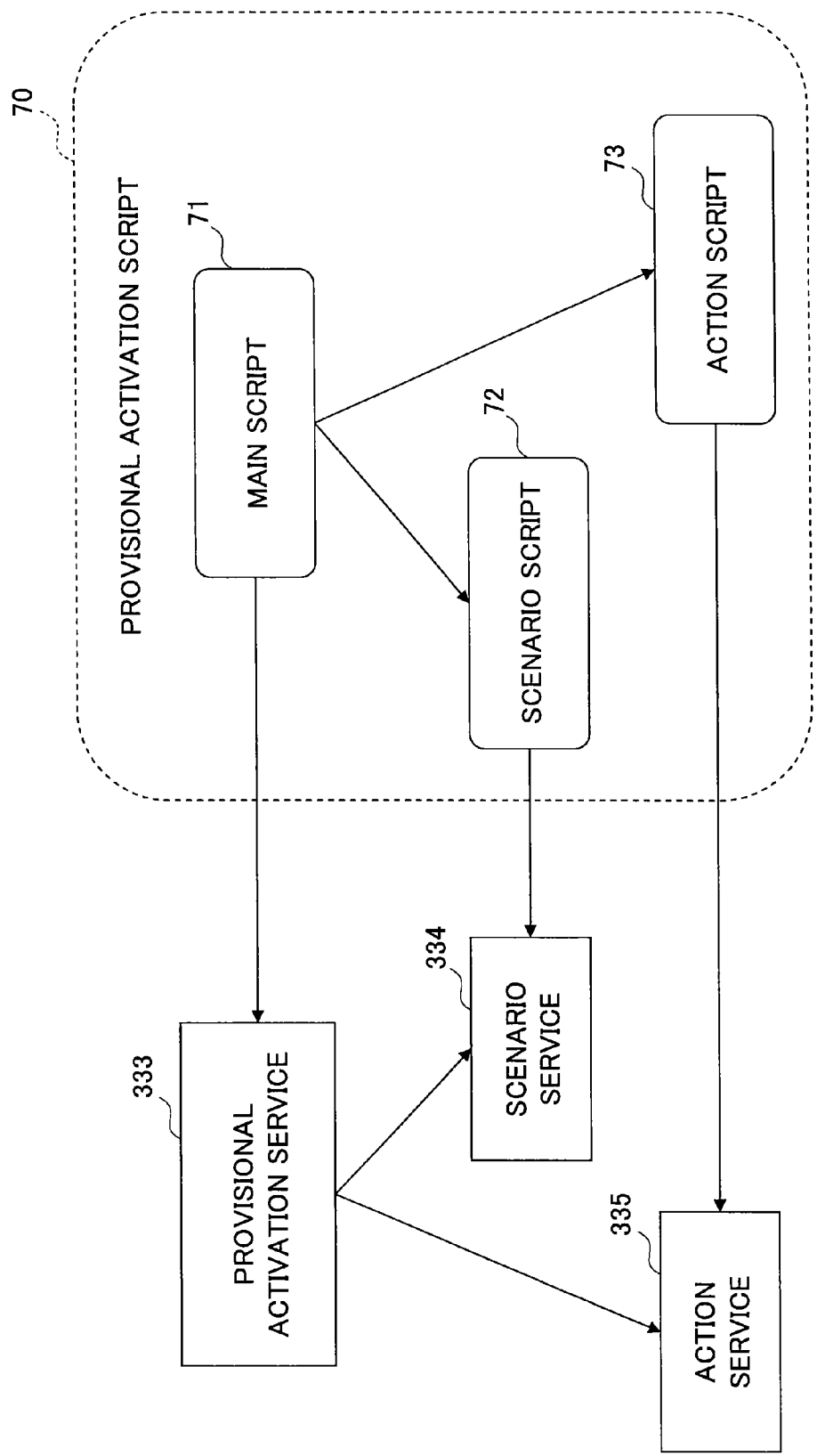
FIG. 6 is a diagram illustrating a provisional activation script and a temporary activation service.

The provisional activation script 70 and the provisional activation service 333 are described below in greater detail. FIG. 6 is a diagram illustrating the provisional activation script 70 and the provisional activation service 333.

As shown in FIG. 6, the provisional activation script 70 includes three files, namely, a main script 71, a scenario script 72, and an action script 73. The main script 71 defines the information for identifying the scenario script 72 and the action script 73 to be used for provisional activation and criteria for determining whether provisional activation is successful. The scenario script 72 defines the scenario of provisional activation. The scenario is a procedure for operating a provisionally activated application using the operations panel 202. The action script 73 defines actions (the content of emulation) of the native service layer 60 in response to a call transmitted to the provisional activation service 333 by the request path control unit 50.

The main script 71 is interpreted by the provisional activation service 333. Therefore, the provisional activation service 333 controls provisional activation according to the main script 71. The provisional activation service 333 generates a thread (a scenario service 334) for interpreting the scenario script 72 and a thread (an action service 335) for interpreting the action script 73.

The scenario service 334 functions as a pseudo operator that enters an operational instruction for the provisionally activated application according to the scenario script 72. A call from the application to the native service layer 60, which call is generated according to the operational instruction of the scenario service 334, is transmitted to the action service 335 by the request path control unit 50. The action service 335 performs emulation in response to the transmitted call according to the definition of the action script 73, and sends a response indicating the result in the same form as the form used by the native service layer 60. Because the transmitted response is in the same form as the form used by the native service layer 60, it appears to the application that the native service layer 60 has been called.

Figure 7:
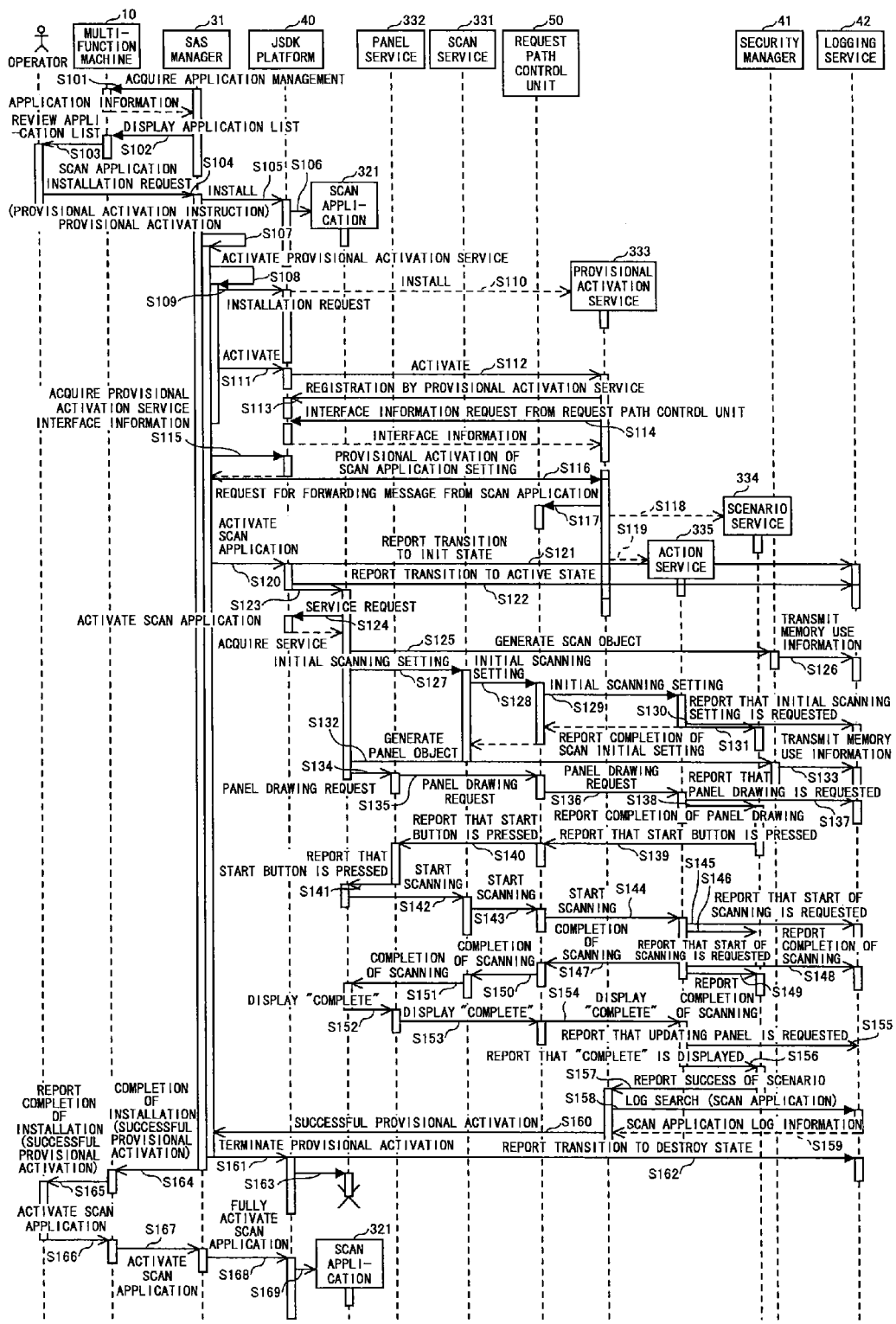
FIG. 7 is a sequence diagram illustrating a processing procedure for provisional activation by a multifunction machine according to a first embodiment.

A processing procedure performed by the multifunction machine 10 is described below. FIG. 7 is a sequence diagram illustrating a processing procedure for provisional activation by the multifunction machine 10 according to a first embodiment.

When installation of an application is requested, the SAS manager 31 searches for application management files stored in an SD card in the memory card slot 234 of the multifunction machine 10, and acquires all the detected application management files from the SD card (Step S101). Each application management file stores information about components of the corresponding application, information necessary for installation, and other management information (hereinafter referred to as "application information"). The application management files are attached to their corresponding applications. That is, if plural JSDK applications 30 are stored in the SD card, plural application management files are acquired.

FIG. 8 is a diagram showing an example of application information stored in an application management file of the scan application 321. The application information 410 shown in FIG. 8 is expressed in an extended format of JNLP (Java Network Launch Protocol (JSR-56)) based on XML (eXtensible Markup Language).

The application information 410 includes an information element 411 enclosed by <information> tags, a resource element 412 enclosed by <resources> tags, a pseudo-boot element 413 enclosed by <pseudo-boot> tags, and an xlet-desc element 414 enclosed by <xlet-desc> tags.

The information element 411 contains information for identifying the application (the scan application 321). For example, a product-id element 4111 contains the product ID of the scan application 321. A title element 4112 contains the title (application name) of the scan application 321. A vendor element 4113 contains the name of the vendor who has developed the scan application 321.

The resource element 412 contains information about resources necessary for executing the scan application 321. For example, the value of an href attribute of a jar element 4121 specifies the file name (path name) of a JAR file of the scan application 321.

The pseudo-boot element 413 defines information about provisional activation. For example, the value of a trigger attribute 4131 of the pseudo-boot element 413 specifies the timing to execute provisional activation. In the example of FIG. 8, the value of the trigger attribute 4131 is "install", indicating that provisional activation is performed at the time of installation of the scan application 321. The value of a platform attribute 4132 specifies the platform on which provisional activation is performed. In the example of FIG.

8, the value of the platform attribute 4132 is "same", indicating that provisional activation is performed on the same platform as the platform on which full activation is performed. The value of an href attribute of a pb element 4133 specifies the file name ("ScanApp. pb") of the main script 71 of the provisional activation script 70 of the scan application 321. Note that the pseudo-boot element 413 is contained in the case where provisional activation is required. Therefore, the necessity of performing provisional activation can be determined based on whether the pseudo-boot element 413 is contained.

The value of a visible attribute 4141 of the xlet-desc element 414 specifies whether the scan application 321 performs screen display on the operations panel 202. In the example of FIG. 8, the value of the visible attribute 4141 is "visible", indicating that the scan application 321 performs screen display.

While FIG. 8 shows an example of application information of the scan application 321, application information of other applications is defined in the same format as the format of the application information of the scan application 321.

Next, the SAS manager 31 determines which application is installable in the multifunction machine 10 based on the acquired application management files, and causes the operations panel 202 to show a list of installable applications (for example, a list of the name of installable applications) (Steps S102 and S103).

An operator selects an application to be installed from the list of the applications shown on the operations panel 202. In this example, the scan application 321 is selected. When the scan application 321 is selected, a request for starting installation of the scan application 321 is transmitted to the SAS manager 31 (Step S104).

In response to the request for starting installation, the SAS manager 31 requests the JSDK platform to install the scan application 321 according to the content of the application management file (the application information 410) of the scan application 321 (Step S105). The JSDK platform 40 installs the scan application 321 as a bundle (Step S106).

Then, the SAS manager 31 determines whether an instruction for provisional activation (pseudo-boot element 413) is contained in the application information 410. If an instruction for provisional activation is contained, the SAS manager 31 starts provisional activation of the scan application 321 (Step S107). If the provisional activation service 333 is not activated, the SAS manager 31 starts activation of the provisional activation service 333 (Step S108). First, the SAS manager 31 requests the JSDK platform 40 to install the provisional activation service 333 (Step S109), and the JSDK platform installs the provisional activation service 333 (Step S110). Then the SAS manager 31 requests the JSDK platform 40 to activate the provisional activation service 333 (Step S111), so that the JSDK platform activates the provisional activation service 333 (Step S112).

When the provisional activation service 333 is activated, the provisional activation service 333 registers interface information pieces about services that the provisional activation service 333 can offer in the JSDK platform 40 (Step S113). The provisional activation service 333 acquires an interface information piece of the request path control unit 50 from the JSDK platform 40 (Step S114). In this example, the interface information piece indicates information necessary for calling the request path control unit 50. It is to be noted that the request path control unit 50 is activated when, for example, the multifunction machine 10 is started. At this point, the interface information piece of the request path control unit 50 is registered into the JSDK platform 40.

The SAS manager 31 acquires an interface information piece of the provisional activation service 333 from the JSDK platform 40 (Step S115). The SAS manager 31 refers to the pb element 4133 of the application information 410 to acquire the main script 71 corresponding to the file name ("ScanApp.pb") specified in the pb element 4133. The SAS manager 31 transmits the main script 71 and the application name of the scan application 321 to the provisional activation service 333, thereby requesting the provisional activation service 333 to control provisional activation of the scan application 321 (Step S116).

FIG. 9 is a diagram showing an example of descriptions of the main script 71 according to the first embodiment. The descriptions contained in the main script 71 are described below in connection with steps where the descriptions are executed. In this embodiment, the main script 71, the scenario script 72, and the action script 73 are stored in the SD card storing the corresponding application.

The provisional activation service 333 transmits the application name of the scan application 321, which is to be provisionally activated, to the request path control unit 50, and requests the request path control unit 50 to transmit, to the provisional activation service 333, a request (message) from the scan application 321 for a call to the native service layer 60 (Step S117). The request path control unit 50 retains the application name transmitted in Step S5117 to identify the application to be provisionally activated.

The provisional activation service 333 executes a description 711 of the main script 71. The description 711 defines that provisional activation is performed using the scenario script 72 with a file name of "ScanApp.s" and the action script 73 with a file name of "ScanApp.b". Accordingly, the provisional activation service 333 activates (generates) the scenario service 334 and transmits the scenario script 72 (ScanApp.s) to the scenario service 334 (Step S118). Further, the provisional activation service 333 activates (generates) the action service 335 and transmits the action script 73 (ScanApp.b) to the action service 335 (Step S119).

FIG. 10 is a diagram showing an example of descriptions of the scenario script 71 according to the first embodiment. The scenario script 72 shown in FIG. 10 defines that, if a start button is pressed after 3 seconds since the operations screen of the scan application 321 is displayed and a character string "Complete" is displayed on the operations screen, the operation is determined to be performed according to the scenario. This definition is premised on the operations screen of the scan application 321 being configured as described below.

Figure 11:
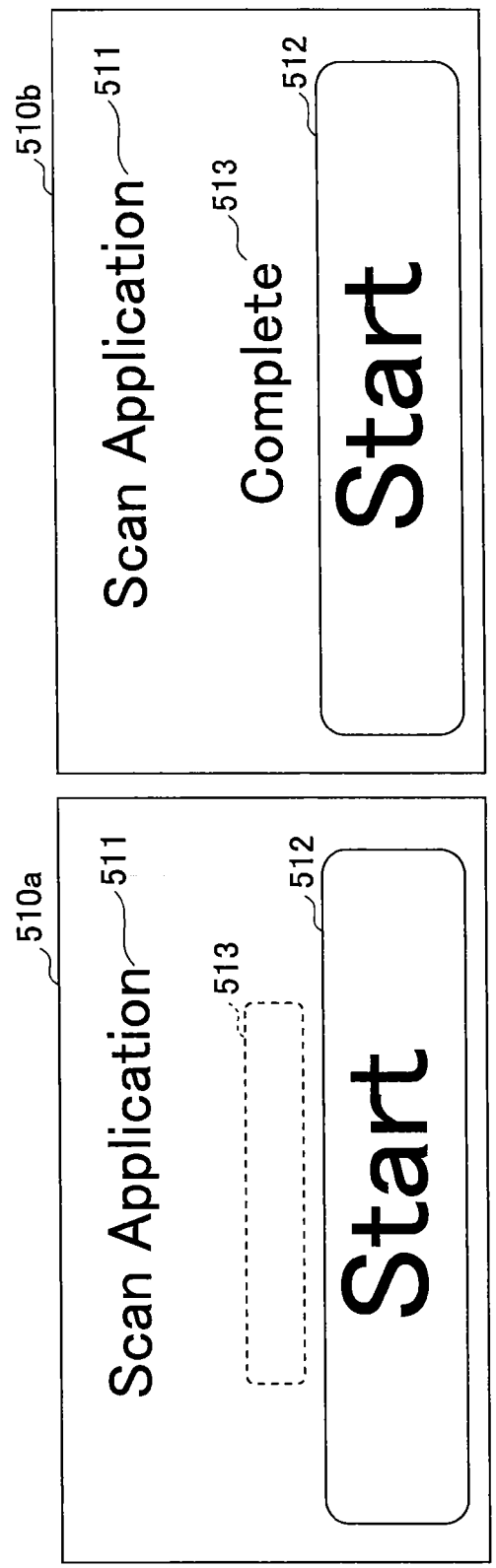
FIG. 11 is a diagram illustrating examples of an operations screen of a scan application.

FIG. 11 is a diagram showing examples of an operations screen of the scan application 321.

FIG. 11 shows two examples of an operations screen. The operations screen 510a at the left side is displayed when the scan application 321 is in the initial state (immediately after the operations screen is displayed). The operations screen 510b at the left side is displayed when the scan application 321 is successfully completed. In the following description, the operations screens 510a and 510b are refereed to as an "operations screen 510" when there is no need to differentiate them.

In this embodiment, the operations screen 510 includes a label 511 indicating that the application to be activated is the scan application 321, a start button 512, and a Result label 513. The start button 512 is used by a user to enter an instruction for starting execution of the scan application 321. The Result label 513 is configured to display the processing result of the scan application 321. If the scan application 321 is successfully completed (if scanning is successful), a character string "Complete" is displayed as shown in the operations screen 510b. If the scan application 321 is abnormally terminated (if scanning has failed), a character string of, e.g., "Error" is displayed. Note that, as shown in the operations screen 510a, the Result label 513 displays nothing when the scan application 321 is in the initial state.

FIG. 12 is a diagram showing an example of descriptions of the action script 73 according to the first embodiment. The descriptions of the action script 73 are not definitions that are executed in certain steps but are setting information pieces of the action service 335. A description 731 defines to act (emulate) as if an operation is successfully performed in response to a request related to a scan service (a module in the native service layer 60 that provides a service related to a scanner (the imaging unit 121)). A description 732 defines to act (emulate) as if an operation is successfully performed in response to a request related to a panel service (a module in the native service layer 60 that provides a service related to the operations panel 202).

The SAS manager 31 requests the JSDK platform 40 to activate the scan application 321 (Step S120). The scan application 321 is provisionally activated by the provisional activation service 333. In response to the request for activation of the scan application 321, the JSDK platform 40 shifts the state of the scan application 321 to the init state and transmits, to the logging service 42, information indicating that the scan application 321 has moved to the init state (Step S121). The logging service 42 records the transmitted information in a provisional activation log 80.

Figure 13:
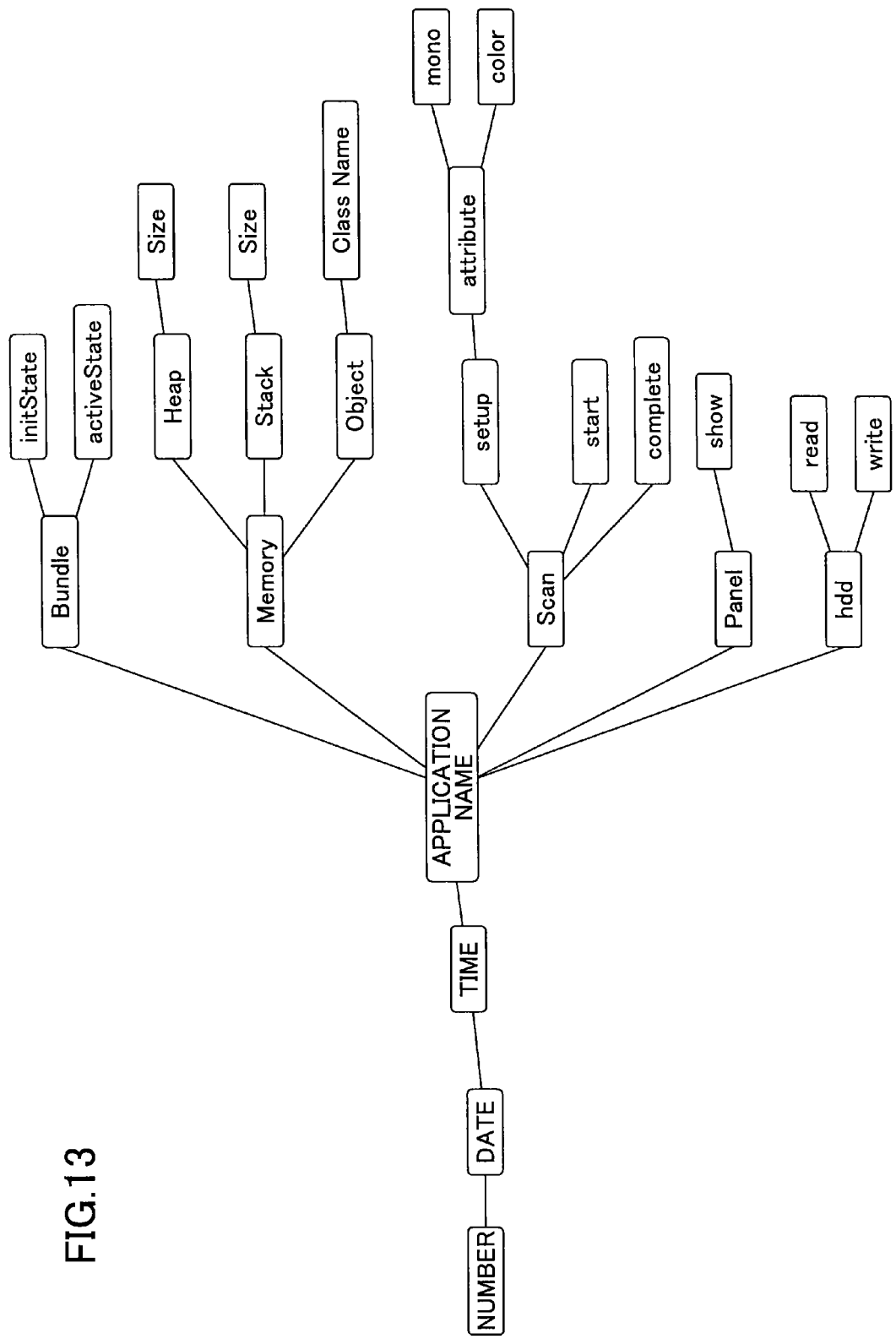
FIG. 13 is a diagram illustrating an example of syntax of a provisional activation log.

The provisional activation log 80 is written in a file according to, for example, syntax as described below. FIG. 13 is a diagram illustrating an example of syntax of the provisional activation log 80. In FIG. 13, a single line (a single record) of syntax of a provisional activation log is written in a tree format. Each node of the tree is an item constituting the provisional activation log 80.

As shown in FIG. 13, the provisional activation log 80 contains the number as a first item, date as a second item, time as a third item, and the application name as a fourth item. The number indicates the recorded order of a log entry. The date and time indicate when the log entry was recorded. The application name indicates the name of a provisionally activated application. The application name may be substituted for by the product ID. As a fifth item, the type of the recorded content of the log entry is contained. As the type, "Bundle", "Memory", "Scan", "panel", or "hdd" is recorded.

The "Bundle" indicates that the log entry is related to a state transition of a bundle (application). In this case, the state (e.g., "initState" or "activeState") of the bundle after a transition is recorded as a sixth item. The "initState" indicates the init state. The "activeState" indicates the active state.

The "Memory" indicates that the log entry is related to reserving or releasing memory space. In this case, as the sixth item, the total usage of a heap memory by the application is recorded in a format of "Heap=<Size>". As a seventh item, the total usage of a stack area by the application is recorded in a format of "Stack=<Size>". As an eighth item, for example, "Object" is recorded as the type of an item for which memory is newly reserved. The "Object" indicates an object. As a ninth item, the "Object" is recorded as the type or the class name of the item for which memory is newly reserved. Although the "Heap", the "Stack", and the "Object" appear to have a selective relationship in FIG. 13, these items are serially recorded as described above.

The "Scan" indicates that the log entry is related to an operation of a scanner (the imaging unit 121). In this case, the type (e.g. "setup", "start", or "complete") of the operation related to the scanner is recorded as the sixth item. The "setup" indicates setting up the scanner. The "start" indicates starting scanning. The "complete" indicates that the scanning is successful. In the case of the "setup", a value ("attribute") indicating an attribute setting is recorded as the seventh item; and a value ("mono") indicating monochrome scanning or a value ("color") indicating color scanning is recorded as the eighth item.

The "Panel" indicates that the log entry is related to an operation of the operations panel 202. In this case, the type (e.g., "show") of the operation of the operations panel 202 is recorded as the sixth item. The "show" indicates displaying information (a screen, a message, etc.,) on the operations panel 202.

The "hdd" indicates that the log entry is related to an operation of the HDD 233. In this case, the type (e.g., "read" or "write") of the operation is recorded as the sixth item. The "read" indicates reading information. The "write" indicates writing information.

FIG. 14 is a diagram illustrating an example of the provisional activation log 80. In the example shown in FIG. 14, the provisional activation log 80 is written according to the syntax shown in FIG. 13. The provisional activation log 80 of FIG. 14 is described in a CSV (Comma Separated Values) format. In FIG. 14, a first line is an example of a log entry recorded in response to the information transmitted in Step S121. In the log entry of the first line, "0001" indicates the number; "2007.05.10" indicates the date; "11:30:24:04" indicates the time; and the "ScanApp" indicates the application name of the scan application 321. Further, a fifth item is "Bundle", and a sixth item is "initState". That is, the log entry of the first line indicates that the scan application 321 is moved to the init state.

Referring back to FIG. 7, after Step S121, in response to the request for activation of the scan application 321, the JSDK platform 40 shifts the state of the scan application 321 to the active state and transmits, to the logging service 42, information indicating that the scan application 321 has moved to the active state (Step S122). The logging service 42 records the transmitted information as a log entry in the provisional activation log 80. The log entry recorded in Step S122 corresponds to a second line of the provisional activation log 80 of FIG. 14. For purposes of simplicity of explanation, a transition of the scan application 321 to the pause state is omitted.

Then the JSDK platform 40 activates the bundle of the scan application 321 (Step S123). When activated, the scan application 321 acquires, from the JSDK platform 40, the interface information pieces of the service bundle 33 to be used by the scan application 321 (Step S124). In this example, the interface information pieces of the scan service 331 and the panel service 332 are acquired. It is to be noted that the scan service 331 and the panel service 332 are activated when, for example, the multifunction machine 10 is started. At this point, the interface information pieces of the scan service 331 and the panel service 332 are registered into the JSDK platform 40.

Then the scan application 321 generates, according to the interface information piece of the scan service 331, an object (an instance of a ScanService class) of the scan service 331 that is necessary for using the scan service 331. To be exact, in the following process, transmission of requests from the scan application 321 to the scan service 331 is performed via this object. Generation of objects of the service bundle 33 such as the scan service 331 is subjected to the access control by the security manager 41. Accordingly, information indicative of the generation of the object of the scan service 331 is transmitted to the security manager 41 in a constructor of the object (Step S125). Having received the information, the security manager 41 identifies the class name of the generator (the scan application 321) that has generated the object, and transmits, to the logging service 42, information indicative of consumption of the memory by the scan application 321 together with the class name and the size of the object (Step S126). The size of the object may be determined based on the class name. A detailed description about how the security manager 41 identifies the generator that has generated the object is given below.

The logging service 42 records the transmitted information as a log entry in the provisional activation log 80. The log entry recorded in this step corresponds to a third line of the provisional activation log 80 of FIG. 14. In the third line of the provisional activation log 80 of FIG. 14, "Memory, Heap=2 MB, Stack=100 KB, Object, ScanService=1 MB" is recorded. This indicates that the current total usage of the heap memory by the scan application 321 is 2 MB; the total usage of the stack area is 100 KB; an object of the ScanService class has been generated; and the size of the object is 1 MB.

Then the scan application 321 performs initial setting of the scan service 331 for constructing a scanning process corresponding to an action of the scan application 321 (i.e., initial setting for monochrome scanning) based on the interface information piece of the scan service 331 (Step S127). The scan service 331 attempts to transmit an initial setting request from the scan application 321 to the native service layer 60 via the request path control unit 50 (Step S128). However, because the scan application 321, which is the origin of the initial setting request, is provisionally activated, the request path control unit 50 transmits the initial setting request not to the native service layer 60 but to the action service 335 (Step S129). A detailed description about how the request path control unit 50 determines whether the calling application (in this example, the origin of the initial setting request) is provisionally activated is given below.

The action service 335 emulates initial setting of the scanner, and transmits the processing result to the origin of the request (scan application 321) via the request path control unit 50. In this step, according to the setting defined in the description 731 of the action script 73, information indicating that initial setting is successfully performed is transmitted. Therefore, the scan application 321 determines that initial setting for scanning is successfully performed. If the scan application 321 is not provisionally activated (i.e., if the scan application 321 is fully activated), the request transmitted to the request path control unit 50 is transmitted to the native service layer 60, so that initial setting is actually performed.

Then the action service 335 transmits, to the logging service 42, information indicating that initial setting for monochrome scanning is requested (Step S130). The logging service 42 records the transmitted information as a log entry in the provisional activation log 80. The log entry recorded in this step corresponds to a fourth line of the provisional activation log 80 of FIG. 14. Also, the action service 335 transmits, to the scenario service 334, information indicative of completion of (the emulation of) initial setting for monochrome scanning (Step S131). The scenario service 334 is a service that functions as a pseudo operator of an application, and hence the scenario service 334 cannot function until the operations screen 510*a* for the application is displayed on the operations panel 202. The scenario service 334 therefore does not start execution of the definitions of the scenario script 72 and ignores information from the action service 335 until the completion of drawing (displaying) the operations screen 510*a* on the operations panel 202 is reported.

Transmission of information by the action service 335 to the logging service 42 and the scenario service 334 is an operation performed according to logic that is previously incorporated in the action service 335 (and is not an operation performed based on the action script 73). That is, the action service 335 is configured to, upon receiving a service request whose path is changed by the request path control unit 50, transmit to the logging service 42 information indicative of reception of the service request and also transmit to the scenario service 334 the result of emulation performed by the action service 335 in response to the service request.

Then the scan application 321 generates, according to the interface information piece of the panel service 332, an object (an instance of a PanelService class) of the panel service 332 that is necessary for using the panel service 332. To be exact, in the following process, transmission of requests from the scan application 321 to the panel service 332 is performed via this object. Information indicative of the generation of the object of the panel service 332 is transmitted to the security manager 41 in a constructor of the object (Step S132). Having received the information, the security manager 41 identifies the class name of the generator (the scan application 321) that has generated the object, and transmits, to the logging service 42, information indicative of consumption of the memory by the scan application 321 together with the class name and the size of the object (Step S133). The logging service 42 records the transmitted information as a log entry in the provisional activation log 80. The log entry recorded in this step corresponds to a fifth line of the provisional activation log 80 of FIG. 14. In the fifth line of the provisional activation log 80 of FIG. 14, "Memory, Heap=3 MB, Stack=300 KB, Object, PanelService=1 MB" is recorded. This indicates that the current total usage of the heap memory by the scan application 321 is 3 MB; the total usage of the stack area is 300 KB; an object of the PanelService class has been generated; and the size of the object is 1 MB.

Then the scan application 321 transmits, based on the interface information piece of the panel service 332, a request for drawing the operations screen 510*a* of the scan application 321 on the operations panel 202 to the panel service 332 (Step S134).

The panel service 332 constructs (generates) screen information to be transmitted to the native service layer to draw the operations screen 510*a* of the scan application 321 on the operations panel 202, and attempts to transmit the request for drawing the operations screen 510*a* based on the screen information to the native service layer 60 via the request path control unit 50 (Step S135). However, because the scan application 321, which is the origin of the request for drawing the operations screen 510*a*, is provisionally activated, the request path control unit 50 transmits the drawing request, together with the screen information, not to the native service layer 60 but to the action service 335 (Step S136).

The action service 335 emulates drawing the operations screen 510*a* based on the screen information. As a result, the operations screen 510*a* is virtually drawn. The term "virtually" indicates that the operations screen 510*a* is not actually displayed on the operations panel 202. However, the screen information of the operations screen 510a is retained in the action service 335. The action service 335 transmits the result of the emulation of drawing the operations screen 510a to the origin of the request (scan application 321) via the request path control unit 50. In this step, according to the setting defined in the description 732 of the action script 73, information indicating that drawing is successfully performed is transmitted.

Then the action service 335 transmits, to the logging service 42, information indicating that drawing the operations screen 510a is requested (Step S137). The logging service 42 records the transmitted information as a log entry in the provisional activation log 80. The log entry recorded in this step corresponds to a sixth line of the provisional activation log 80 of FIG. 14. Also, the action service 335 transmits, to the scenario service 334, information indicative of completion of (the emulation of) drawing the operations screen 510a (Step S138).

Having received the information indicative of completion of drawing the operations screen 510a, the scenario service 334 starts a process corresponding to the definitions of the scenario script 72. First, based on a description 721 of FIG. 10, an object (hereinafter referred to as a "start button object") of the start button 512 of the operations screen 510a (FIG. 11) is acquired. The start button object is an object of an object group constituting the screen information of the operations screen 510, and is acquired by the action service 335 in response to a call to a function described in the description 721. After a predetermined time period (three seconds) specified by an argument of a function since the operations screen 510a is displayed, which function is described in the description 722, a message indicating that the start button 512 is pressed is transmitted to the request path control unit 50 based on a description 723 (Step S139). Note that transmitting the message indicating that pressing the start button 512 is performed after three seconds since the operations screen 510a is displayed in order to make a pseudo entry of an input by the scenario service 334 similar to an actual entry of an input by a user. That is, because an actual user does not press the start button 512 immediately after the operations screen 510a is displayed, but rather presses the start button 512 after about three seconds since the operations screen 510a is displayed.

Then the scenario service 334 acquires, based on a description 742 of the scenario script 72, an object (hereinafter referred to as a "Result label object") of the Result label 513 of the operations screen 510. The Result label object is an object of the object group constituting the screen information of the operations screen 510, and is acquired by the action service 335 in response to a call to a function described in the description 724.

Then, based on a description 725 of the scenario script 72, the scenario service 334 is placed in a waiting state to wait for the Result label 513 to be updated. Therefore, the process following a description 726 is not performed at this stage.

Meanwhile, having received from the scenario service 334 the message indicating that the start button 512 is pressed in Step S139, the request path control unit 50 transmits the message to the panel service 332 (Step S140).

Having received the message indicating that the start button 512 is pressed, the panel service 332 transmits, to the scan application 321, information indicating that the start button 512 is pressed (Step S141). Having received the message indicating that the start button 512 is pressed, the scan application 321 requests the scan service 331 to start scanning (Step S142). The scan service 331 attempts to transmit a scanning start request from the scan application 321 to the native service layer 60 via the request path control unit 50 (Step S143). However, because the scan application 321, which is the origin of the scanning start request, is provisionally activated, the request path control unit 50 transmits the scanning start request not to the native service layer 60 but to the action service 335 (Step S144).

Then the action service 335 transmits, to the logging service 42, information indicating that starting scanning is requested (Step S145). The logging service 42 records the transmitted information as a log entry in the provisional activation log 80. The log entry recorded in this step corresponds to a seventh line of the provisional activation log 80 of FIG. 14. Also, the action service 335 transmits, to the scenario service 334, information indicating that scanning is to be started (Step S146). Because the scenario service 334 is in the waiting state to wait for the Result label 513 to be updated, the scenario service 334 performs no operation.

Then the action service 335 emulates scanning, and transmits the processing result to the request path control unit 50 (Step S147). In the Step S147, according to the setting defined in the description 731 of the action script 73, a message indicating that scanning is successfully performed (completed) is transmitted. Also, the action service 335 transmits information indicative of the successful completion of scanning to the logging service 42 and the scenario service 334 (Steps S148, S149). The logging service 42 records the transmitted information as a log entry in the provisional activation log 80. The log entry recorded in this step corresponds to an eighth line of the provisional activation log 80 of FIG. 14. Having received the information indicative of the successful completion of scanning, the scenario service 334 performs no operation because the scenario service 334 is in the waiting state to wait for the Result label 513 to be updated.

Meanwhile, having received the message indicative of the successful completion of scanning from the action service 335 in Step S147, the request path control unit 50 transmits the message to the scan service 331 (Step S150). The scan service 331 transmits information indicative of the successful completion of scanning to the origin of the scanning start request, namely, the scan application 321 (Step S151).

Having received the information indicative of the successful completion of scanning, the scan application 321 requests the panel service 332 to display a character string "Complete" on the Result label 513 of the operations screen 510 (Step S152). In response to the request from the scan application 321, the panel service 332 attempts to transmit the request for displaying the character string "Complete" to the native service layer 60 via the request path control unit 50 (Step S153). However, because the scan application 321, which is the origin of the request for displaying the character string "Complete", is provisionally activated, the request path control unit 50 transmits the request for displaying the character string "Complete" not to the native service layer 60 but to the action service 335 (Step S154).

The action service 335 virtually displays the "Complete" on the Result label 513. More specifically, the action service 335 specifies the character string "Complete" to the Result label object in the retaining screen information, thereby emulating a process of displaying the character string "Complete". The action service 335 transmits the result of the emulation to the origin of the request (scan application 321) via the request path control unit 50. In this step, according to the setting defined in the description 732 of the action script 73, information indicating that the character string "Complete" is successfully displayed is transmitted.

Then the action service 335 transmits, to the logging service 42, information indicating that updating the operations screen 510 is requested (Step S155). The logging service 42 records the transmitted information as a log entry in the provisional activation log 80. The log entry recorded in this step corresponds to a ninth line of the provisional activation log 80 of FIG. 14. Also, the action service 335 transmits, to the scenario service 334, information indicating that the character string "Complete" is displayed on the Result label 513 (Step S156).

Having received the information, the scenario service 334 moves back from the waiting state to wait for the Result label 513 to be updated, and determines whether the character string displayed on the Result label 513 is "Complete" according to the description 726 of the scenario script (FIG. 10). If the character string displayed on the Result label 513 is "Complete", the scenario service 334 transmits to the provisional activation service 333, according to a description 727, information indicating that the provisionally activated application operates according to the scenario (a success of the scenario) (Step S157). On the other hand, if the character string displayed on the Result label 513 is not "Complete", the scenario service 334 transmits to the provisional activation service 333, according to a description 728, information indicating that the provisionally activated application does not operate according to the scenario (a failure of the scenario).

Having received the information indicative of the success of the scenario, the provisional activation service 333 requests the logging service 42 to search for the provisional activation log of the application (the scan application 321) with the name "ScanApp" according to a description 712 of the main script 71 (FIG. 9) (Step S158). The logging service 42 searches for the provisional activation log of the scan application 321 in the provisional activation log 80 based on the application name and transmits the search result to the provisional activation service 333 (Step S159). In the example shown in FIG. 14, the provisional activation log 80 only contains log information of the scan application 321. Therefore, the contents in the first line through the ninth line shown in FIG. 14 are transmitted to the provisional activation service 333.

Then, according to a description 713 of the main script (FIG. 9), the provisional activation service 333 determines whether the provisional activation is successful. The description 713 defines conditions of successful provisional activation, which are: the memory usage is less than 5 MB; no data are written into the HDD 233; and the scan mode is monochrome. Therefore, the provisional activation service 333 searches for the maximum value in the log indicating the usage of the heap memory written in the format "Memory, Heap=xxx MB" in the provisional activation log 80, and determines whether the detected maximum value is equal to or less than 5 MB. Also, the provisional activation service 333 searches for a description such as "hdd, write" in the provisional activation log 80 to determine whether data are written into the HDD 233. Further, the provisional activation service 333 searches for a description such as "Scan, setup, attribute, mono" in the provisional activation log 80 to determine whether the scan mode is monochrome.

According to the provisional activation log 80 of this embodiment, as written in the third line, the maximum value of the usage of the heap memory is 3 MB, which is less than 5 MB. There is no description such as "hdd, write". This indicates that no data are written into the HDD 233. A description "Scan, setup, attribute, mono" is contained in the fourth line. This indicates that the scan mode is monochrome. That is, the conditions of successful provisional activation are satisfied. Therefore, according to a description 714 of the main script 71, the provisional activation service 333 transmits information indicative of successful provisional activation to the SAS manager 31 (Step S160).

Having received information indicative of successful provisional activation, the SAS manager 31 requests the JSDK platform 40 to terminate the provisionally activated scan application 321 (Step S161). The JSDK platform 40 transmits, to the logging service 42, information that the scan application 321 is to be moved to the destroy state (Step S162). The logging service 42 records the transmitted information as a log entry in the provisional activation log 80. The log entry recorded in this step corresponds to a tenth line of the provisional activation log 80 of FIG. 14. Then the JSDK platform 40 terminates the scan application 321 (Step S163).

Meanwhile, after requesting termination of the scan application 321 in Step S161, the SAS manager 31 causes the operations panel 202 to display an indication of completion of installation of the scan application 321 (Step S164). This indication lets the operator know that the scan application 321 is successfully installed (Step S165). Then, in order to use the scan application 321, the operator enters an instruction for full activation of the scan application 321 using the operations panel 202 (Step S166). The instruction for full activation of the scan application 321 is transmitted to the SAS manager 31 (Step S167). The SAS manager 31 requests the JSDK platform 40 to fully activate the scan application 321 (Step S168). Then the JSDK platform 40 fully activates the scan application 321 (Step S169).

Requests from the fully activated scan application 321 are transmitted to the native service layer 60 without the path of the requests being changed by the request path control unit 50. Therefore, the operations screen is actually displayed, and scanning is actually performed in response to an entry of an input by the operator on the operations screen.

If provisional activation has failed, (for example, if the provisionally activated scan application 321 does not operate according to the scenario, or if the conditions of successful provisional activation (in the description 713 of the main script 71) are not satisfied, the provisional activation service 333 transmits information indicative of a failure of provisional activation is transmitted to the SAS manager 31 in Step S160 according to a description 715 of the main script 71 (FIG. 9). Having received the information, the SAS manager 31 causes the operations panel 202 to display an indication indicating that installation of the scan application 321 has failed, and disables installation of the scan application 321. Accordingly, the operator cannot fully activate (i.e. cannot actually use) the scan application 321.

Figure 15:
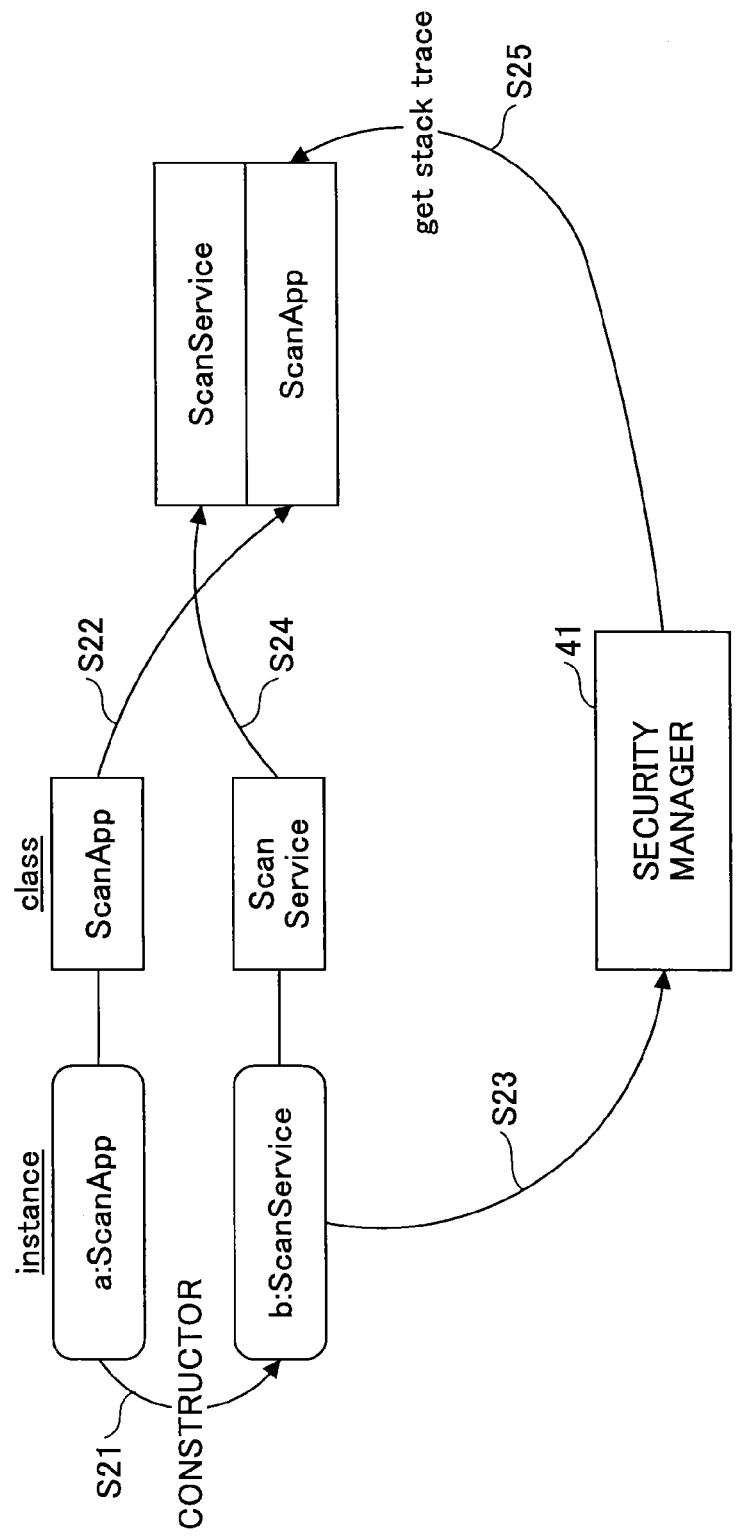
FIG. 15 is a diagram illustrating a method used by a security manager to identify a generator of an object.

A detailed description about how the security manager 41 identifies the generator of an object in Step S126, etc., is given below. FIG. 15 is a diagram illustrating a method used by the security manager 41 to identify the generator of an object. In the example shown in FIG. 15, the scan application 321 generates an object of the scan service 331. That is, the process shown in FIG. 15 corresponds to Steps S125 and S126 of FIG. 7.

In FIG. 15, "ScanApp" represents the class name of the scan application 321; "ScanService" represents the class name of the scan service 331; "a: ScanApp" represents an object a (i.e., an instantiated scan application 321) of the ScanApp class; and "b: ScanService" represents an object b (i.e., an instantiated scan service 331) of the ScanService class.

When the object a calls a constructor of the ScanService class to generate the object b (Step S21), the class name ("ScanApp") is stored in the stack (Step S22). When the object b calls the security manager 41 in the constructor (Step S23), the class name ("ScanService") of the object b is stored in the stack (Step S24). In response to the call from the object b, the security manager 41 traces data in the stack, thereby identifying that the class name of the calling application is "ScanApp", i.e., that the generator of the object b is the scan application 321 (Step S25).

Next, a detailed description about how the request path control unit 50 determines, in Step S129, etc., whether the origin of a request for a call to the native service layer 60 is provisionally activated is described below. First, a premise is that an application to be provisionally activated is registered in the request path control unit 50 (e.g., Step S116). Therefore, if the application name of the origin of a call request can be identified in the request path control unit 50, it is possible to determine whether the application is provisionally activated.

In this embodiment, the application bundle 32 as the JSDK application 30 is provisionally activated. The JSDK application 30 is a Java application. Therefore, for example, it is possible to identify the application using a thread group (ThreadGroup) as a standard Java class. A thread group indicates a thread (Thread) or a group of threads. One or more Threads may be associated with a ThreadGroup. A name (thread group name) may be given to a thread group. In each thread, the thread group to which the current thread belongs can be identified. In this embodiment, the application bundle 32 and the service bundle 33 are implemented as "bundles". The term "bundle" as used herein indicates a library (a collection of functions or classes)" that can be dynamically linked. The request path control unit 50 is also a library (a collection of functions or classes). Accordingly, none of them is activated as a process. The called party operates on a thread of the calling application.

Figure 16:
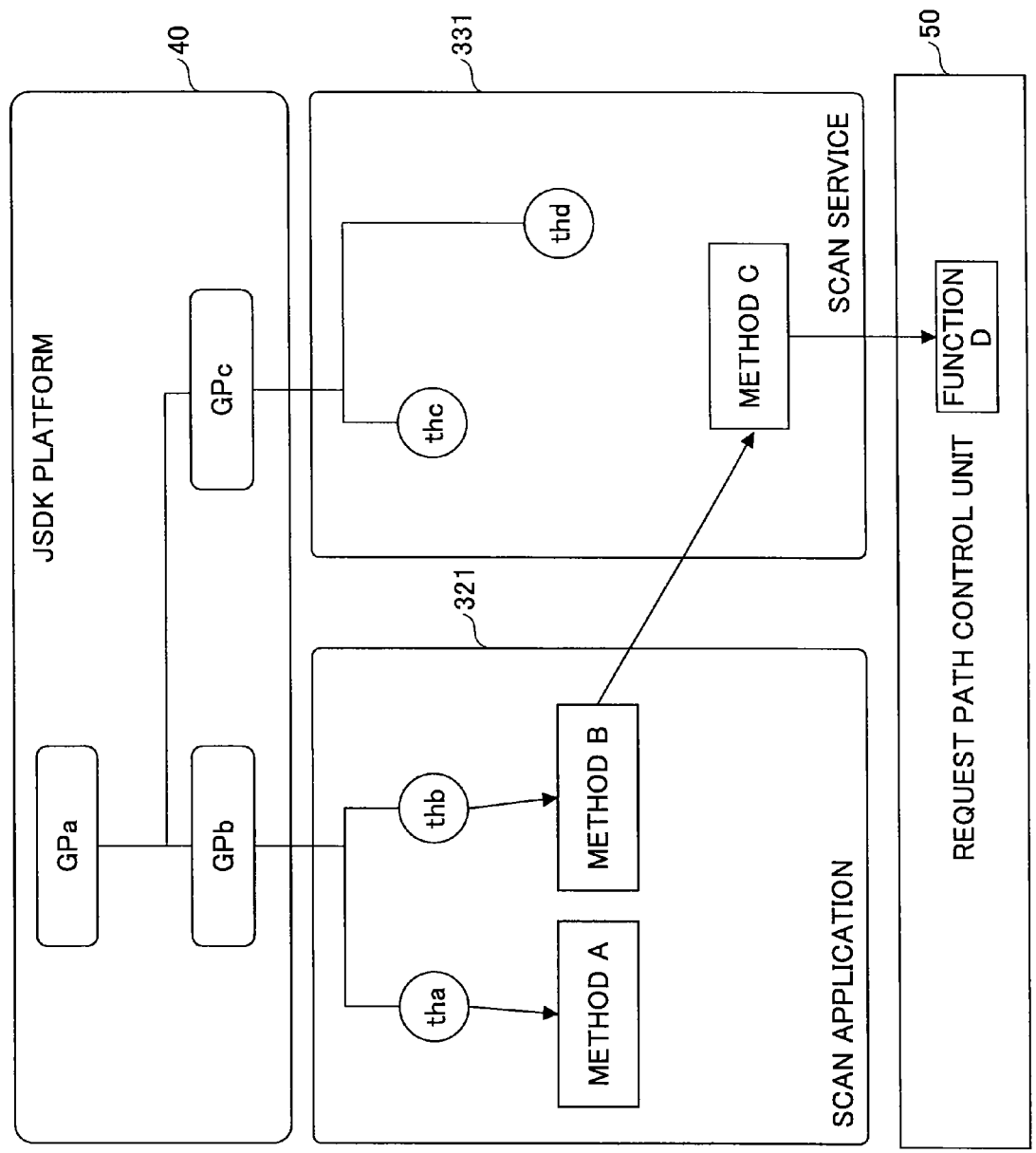
FIG. 16 is a diagram illustrating a method for identifying the name of a calling application using a thread group.

Based on this mechanism, the request path control unit 50 can identify the name of the calling application as described below. FIG. 16 is a diagram illustrating a method for identifying the name of the calling application using a thread group. In FIG. 16, the hierarchical relationship between modules is different from the one shown in FIG. 3 for explanation purposes.

In FIG. 16, GPx (x indicating a-c) indicates a thread group, and thx (x indicating a-d) indicates a thread. In the example of FIG. 16, the scan application 321 is associated with a thread group GPb, to which the application name of the scan application 321 is given as the name of the thread group. The scan service 331 is associated with a thread group GPc.

The scan application 321 includes a thread tha executing a method A and a thread thb executing a method B. The thread tha and the thread thb belong to the thread group GPb. For example, if the method C of the scan service 331 is called from the method B of the scan application 321, the method C operates on the thread thb. Further, if a function D of the request path control unit 50 is called from the method C, the function D operates on the thread thb. Accordingly, the thread thb is identified as the current thread in the function D, and the thread group GPb is identified as the thread group to which the thread thb belongs. Thus, the name of the application that called the function B (i.e., the request path control unit 50) is acquired by acquiring the thread group name of the thread group GPb. Further, the acquired application name (thread group name) is compared with the previously registered name of the provisionally activated application, thereby determining whether the application that called the function B is provisionally activated.

The thread group is not necessarily used for identifying the calling application. For example, the name of the calling application may be taken over by the argument of each method or function.

As described above, according to the multifunction machine 10 of the first embodiment, before actually using an application, the application is provisionally activated, and the log related to its action (a provisional activation log 80) is recorded. Then, it can be determined whether the application satisfies predetermined restrictions based on the provisional activation log 80. Therefore, it is possible to prevent an application that does not satisfy the predetermined restrictions from operating and thus to reduce the risk of malfunction due to the application.

The criteria for determining whether provisional activation is successful, operations of a provisionally activated application, and actions of the action service 335 during provisional activation are defined in the provisional activation script 70 (the main script 71, the scenario script 72, and the action script 73) as a file separate from the program. Therefore, these information pieces (determination criteria, operations, actions, etc.,) can easily be modified according to a change in each application and the resources of the multifunction machine 10 (e.g., adding memory). Especially, if the information pieces are described in a text file format as in this embodiment, the information pieces can more easily be modified.

The action service 335 responds as the native service layer 60 (i.e., responds in the same manner as the native service layer) to the application, so that the application does not need to be conscious of being provisionally activated. Therefore, there is no need to implement the application especially for the purpose of provisional activation.

Applications that do not satisfy the predetermined restrictions can be provisionally activated. Therefore, in the case where an application is provisionally activated while another application is fully activated, the progress of an operation of the fully activated application might be impeded due to a negative influence (such as memory shortage) of the provisionally activated application on the fully activated application.

Figure 17:
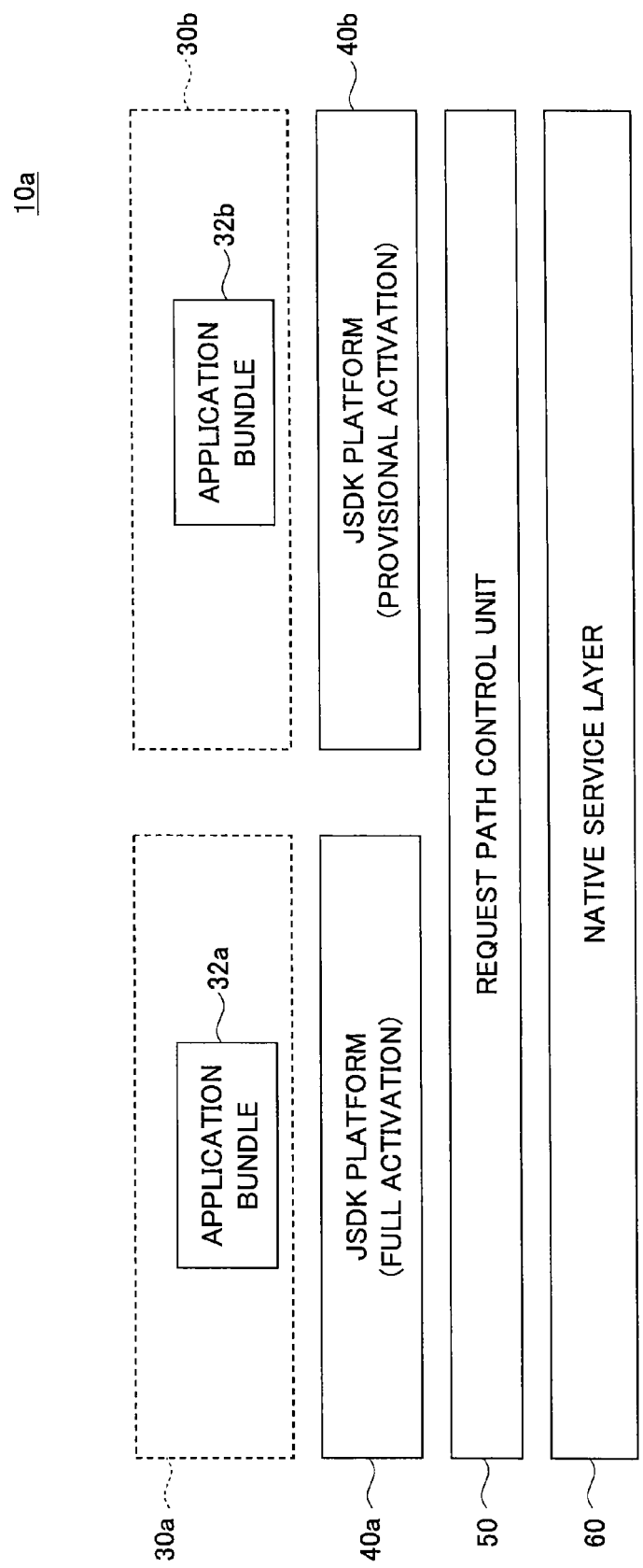
FIG. 17 is a diagram showing an example of a software configuration of a multifunction machine having plural virtual machines.

To avoid such a problem, the software of the multifunction machine 10 may be configured as described below. FIG. 17 is a diagram showing an example of a software configuration of a multifunction machine 10a having plural virtual machines. In FIG. 17, the same elements as those shown in FIG. 3 are indicated by the same reference numerals.

In FIG. 17, the multifunction machine 10a includes two JSDK platforms, namely, a JSDK platform 40a and a JSDK platform 40b. Each JSDK platform 40 includes a Java virtual machine (VM). The virtual machines are activated as separate processes, and JSDK applications 30 (30a, 30b) on the JSDK platforms 40 (40a, 40b) are activated as threads in the processes of the corresponding virtual machines.

In this configuration, it is preferable that the JSDK platform 40a be used as an execution environment for, e.g., a fully activated application bundle 32a, while the JSDK platform 40b be used as an execution environment for, e.g., a provisionally activated application bundle 32b. These execution environments use different processes. Therefore, even if the process of the JSDK platform 40b stops due to malfunction of the application bundle 32b, the risk of negatively affecting the process for full activation is reduced. Therefore, it is possible to prevent the stability of, e.g., the fully activated application bundle 32a from degrading due to execution of provisional activation.

As for the process (virtual machine) for provisional activation, it is preferable that a lower priority order be given than the priority order given to the process (virtual machine) for full activation; a virtual memory be enabled; and the heap memory allocated to the process for provisional activation be greater than the heap memory allocated to the process for full activation. As for the process for full activation, it is preferable that a higher priority order be assigned, and a virtual memory is disabled, thereby improving the real time performance. The reason why different priority orders are assigned to the process for provisional activation and the process for full activation is to prevent a negative effect of execution of provisional activation on the fully activated application. The reasons why the virtual memory for the process for provisional activation is enabled and the heap memory allocated to the process for provisional activation is greater than the heap memory allocated to the process for full activation are because, in order to determine whether the application can be executed using the heap memory having the size allocated for full activation, memory greater than the memory used for full activation needs to be checked first.

As mentioned in connection with FIG. 1, the native service layer 60 is not called during provisional activation, so that hardware specific to the multifunction machine 10 (e.g., hardware for image processing) is not used. Therefore, provisional activation may be performed in the general purpose personal computer (PC) 400. In this case, software excluding the native service layer 60 of FIG. 3 needs to be executable in the computer 400.

A second embodiment is described below. In the first embodiment, whether the memory usage of each application is equal to or less than the limit value (5 MB) is determined based on the provisional activation log 80. However, in the case where plural applications are activated in parallel, the determination made in the first embodiment might not be enough to prevent malfunction.

Figure 18A:
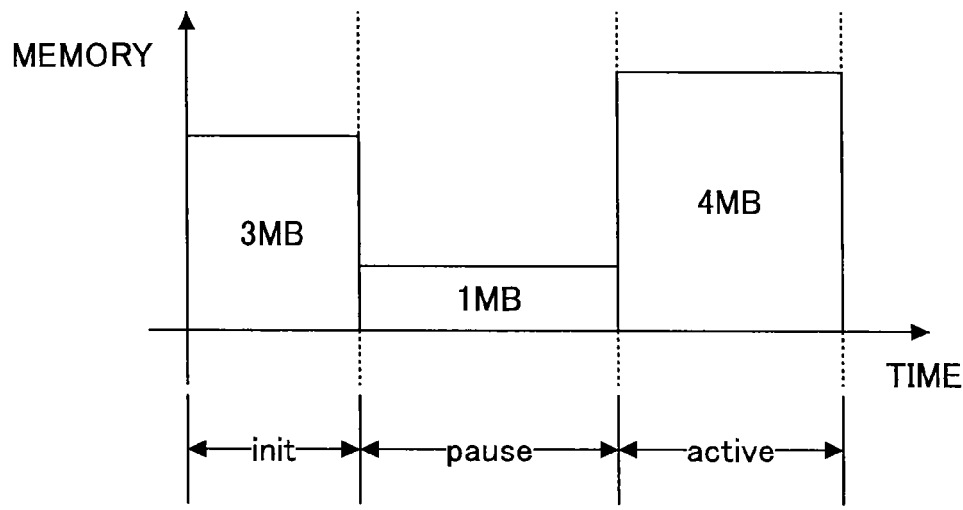
FIGS. 18A-18C are charts illustrating memory consumption by an application(s)
Figure 18B:
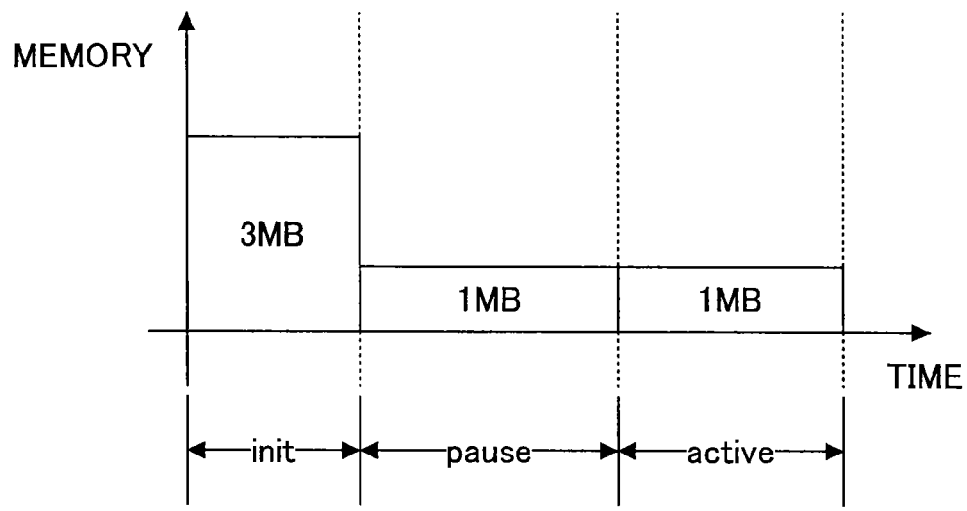
Figure 18C:
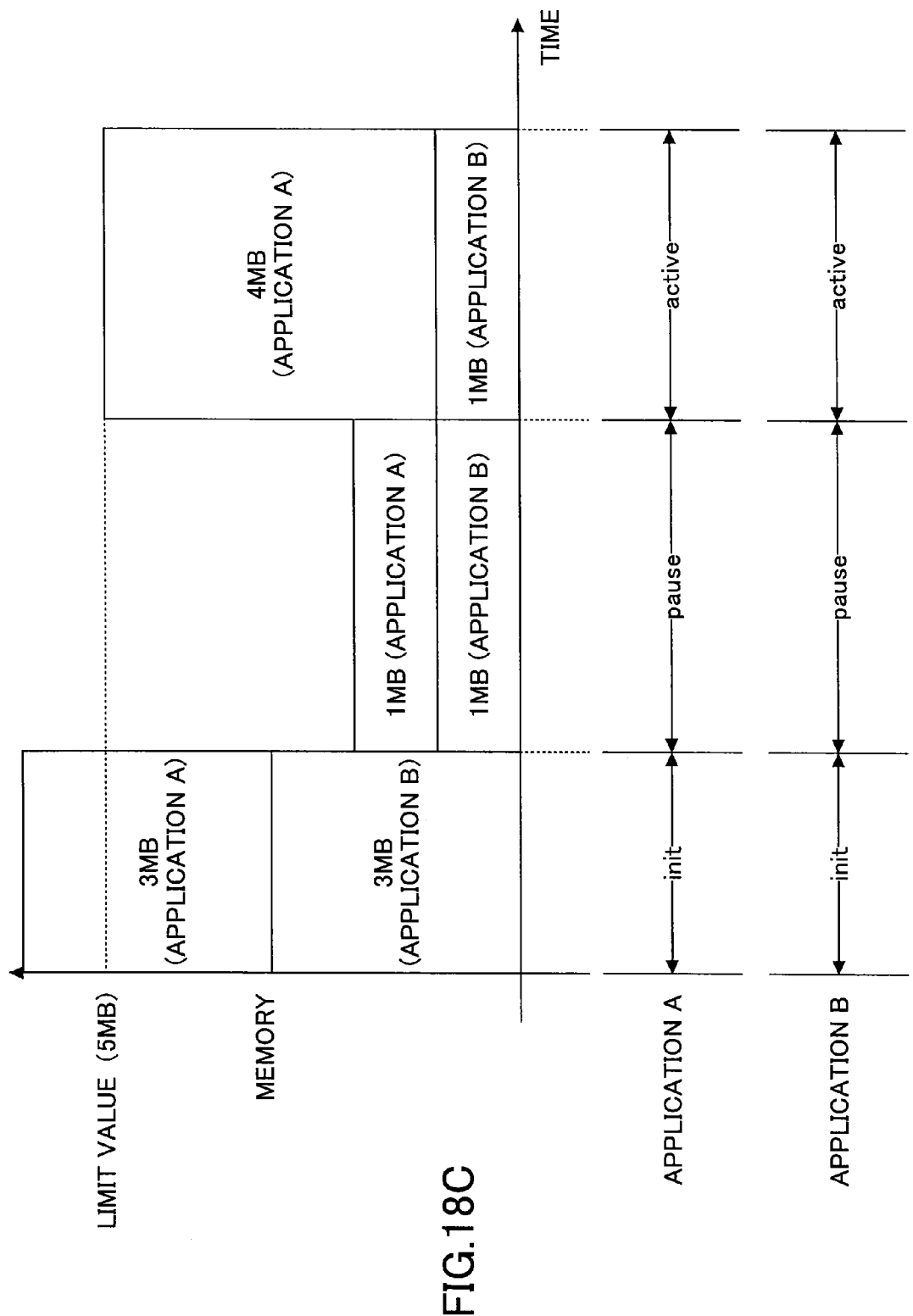

FIGS. 18A-18C are charts illustrating memory consumption by an application(s).

FIG. 18A is a graph showing the relationship between time (the application state transition) and the maximum usage of the heap memory by an application bundle 32 (hereinafter referred to as an "application A"). As shown in FIG. 18A, the maximum usage of the heap memory by the application A is 3 MB in the init state, 1 MB in the pause state, and 4 MB in the active state. In this case, the maximum usage of the heap memory by the application A throughout the states is 4 MB, which is less than 5 MB and satisfies the restriction of the first embodiment. Therefore, provisional activation of the application A is determined to be successful.

FIG. 18B is a graph showing the relationship between time (the application state transition) and the maximum usage of the heap memory by another application bundle 32 (hereinafter referred to as an "application B"). As shown in FIG. 18B, the maximum usage of the heap memory by the application B is 3 MB in the init state, 1 MB in the pause state, and 1 MB in the active state. In this case, the maximum usage of the heap memory by the application B throughout the states is 3 MB, which is less than 5 MB and satisfies the restriction of the first embodiment. Therefore, provisional activation of the application B is determined to be successful as well.

FIG. 18C is a graph showing the relationship between time and the maximum usage of the heap memory by the application A and the application B that are activated at the same time. In the case where two applications each of which full activation is permitted are activated and state transitions of the two applications are performed at the same time, the maximum usage of the heap memory is 3+3=6 MB in the init state, 1+1=2 MB in the pause state, and 1+4=5 MB in the active state. In this case, the maximum usage of the heap memory in the init state exceeds the limit value, i.e., 5 MB, which might result in the applications not operating normally.

This problem is prevented in the second embodiment. Differences between the first embodiment and the second embodiments are described below. Features of the second embodiments not described herein may be the same as the features of the first embodiment.

In the second embodiment, a main script 71a is defined as described below. FIG. 19 is a diagram showing an example of descriptions of the main script 71a according to the second embodiment. In FIG. 19, the same elements as those shown in FIG. 9 are indicated by the same reference numerals. The main script 71a of the second embodiment corresponds to the main script 71 of the first embodiment.

The main script 71a is different from the main script 71 of the first embodiment in having a description 716. The description 716 defines the interface of a script function pb Case 1. In the second embodiment, a variable (PseudoBootLog log) for storing a provisional activation log is defined as an OUT parameter for call by reference. The value of the parameter is defined in the description 712.

The processing procedure for provisional activation by the multifunction machine 10 in the second embodiment is similar to that in the first embodiment. However, in the second embodiment, based on the description 716 in the main script 71a, the provisional activation service 333 transmits the content of the provisional activation log 80 to the SAS manager 31 together with information indicating whether provisional activation is successful in Step S160. The SAS manager 31 associates the transmitted provisional activation log 80 with the provisionally activated application bundle 32 (in the example of FIG. 7, the scan application 321) and stores and manages the provisional activation log 80 in, e.g., the HDD 233. The provisional activation log 80 may be associated with the application bundle 32 by giving the application name of the application bundle 32 as the file name of the provisional activation log 80, for example.

The second embodiment is further different from the first embodiment in how the SAS manager 31 manages activated applications (including applications being activated) when the SAS manager 31 receives an activation instruction in Step S167.

Figure 20:
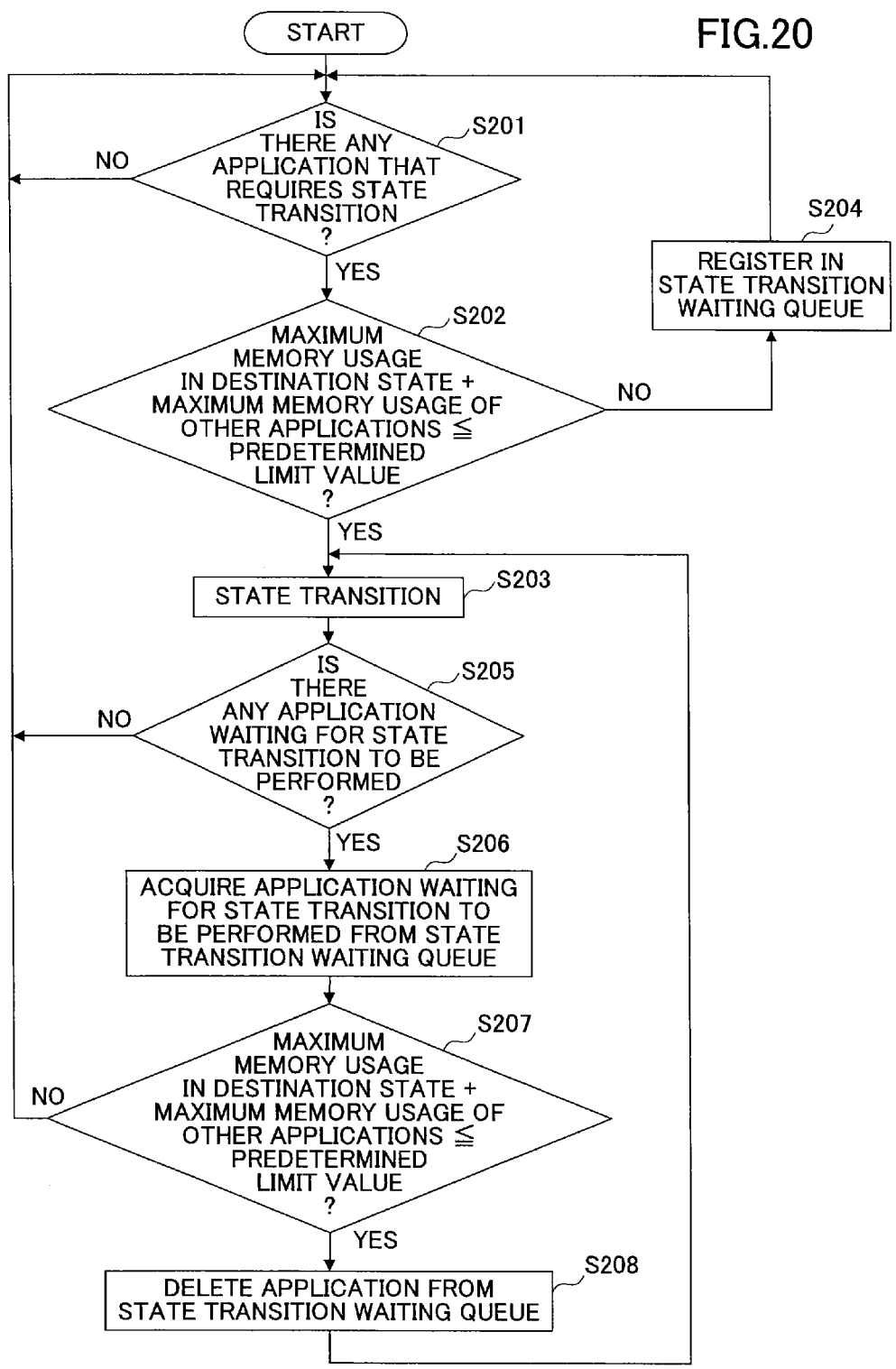
FIG. 20 is a flowchart illustrating how a SAS manager manages activated applications.

FIG. 20 is a flowchart illustrating how the SAS manager 31 manages the activated applications. The processing illustrated in FIG. 20 is performed for to-be-fully-activated applications and fully activated applications (i.e., applications of which provisional activation is successful).

In the multifunction machine 10, if there is an application (hereinafter referred to as an "application A") that requires a state transition (including a state transition to the init state upon activation) (Yes in Step S201), the SAS manager 31 determines whether the sum of the maximum memory usage of the application A in the destination state of the application A and the maximum memory usage of other applications that are currently fully activated is equal to or less than a predetermined limit value (e.g., 5 MB) (Step S202).

Note that the SAS manager 31 determines the maximum memory usage of the application A in the destination state and the maximum memory usage of the other applications in their current states based on the provisional activation logs 80 associated with the respective applications. The SAS manager 31 detects the presence of the application that requires a state transition based on a notice from the application.

If the sum of the maximum memory usage is equal to or less than the limit value (Yes in Step S202), the SAS manager 31 permits a state transition of the application A. Thus the application A moves to its destination state (Step S203). On the other hand, if the sum of the maximum memory usage is greater than the limit value (No in Step S202), the SAS manager 31 withholds a state transition of the application A and registers information (herein after referred to as a "waiting information piece") indicating the application A is waiting for its state transition to be performed. The waiting information piece includes, for example, identification information of the application A and the identification information of the destination state. The waiting information piece may include the maximum memory usage in the destination state in place of the identification information of the destination state. In this case, it is possible to eliminate a process for referring again to the provisional activation log 80 for the memory usage of the destination state of the application A. The state transition waiting queue is a queue or a list of waiting information pieces. Applications waiting for their state transitions to be performed can be identified based on the state transition waiting queue.

When the application A moves to its destination state in Step S203, the sum of the maximum memory usage of each of the applications in their respective states changes due to the state transition of the application A. That is, there is a chance that state transitions of applications waiting for their state transitions to be performed can be permitted. Therefore, the SAS manager 31 executes the processing in Step S205 and the subsequent steps.

More specifically, the SAS manager 31 determines whether there are any waiting information pieces in the state transition waiting queue, thereby determining whether there are any applications waiting for their state transitions to be performed (Step S205). If there is no application waiting for its state transition to be performed (i.e., if the state transition waiting queue is empty) (No in Step S205), the process returns to Step S201.

On the other hand, if there is an application waiting for its state transition to be performed (Yes in Step S205), the SAS manager 31 acquires one waiting information piece from the state transition waiting queue (Step S206). The order of acquiring the waiting information pieces from the state transition waiting queue may be based on FIFO (First-In First-Out) or may be based on LRU (Least Recently Used). Alternatively, applications may be prioritized so that the waiting information pieces are acquired in the order of priority. The order of priority may previously be registered in the HDD 233 or the like.

Then the SAS manager 31 determines whether the sum of the maximum memory usage of the application related to the acquired waiting information piece (hereinafter referred to as a "current waiting information piece") in its destination state and the maximum memory usage of other applications in their respective states is equal to or less than the predetermined limit value (Step S207).

If the sum of the memory usage is equal to or less than the limit value (Yes in Step S207), the SAS manager 31 deletes the current waiting information piece from the state transition waiting queue (Step S208) and moves the application waiting for a state transition to be performed to its destination state (Step S203). After the state transition of the application, the processing in Step S205 and the subsequent steps is performed to determine whether to permit a state transition of one of the other applications.

On the other hand, if the sum of the maximum memory usage is greater than the limit value (No in Step S207), the process returns to Step S201. Alternatively, the process may return to Step S206. In this case, among the applications of which waiting information pieces are registered in the state transition waiting queue, the application for which a state transition can be performed without resulting in exceeding the limit value is given priority for a state transition.

Figure 21:
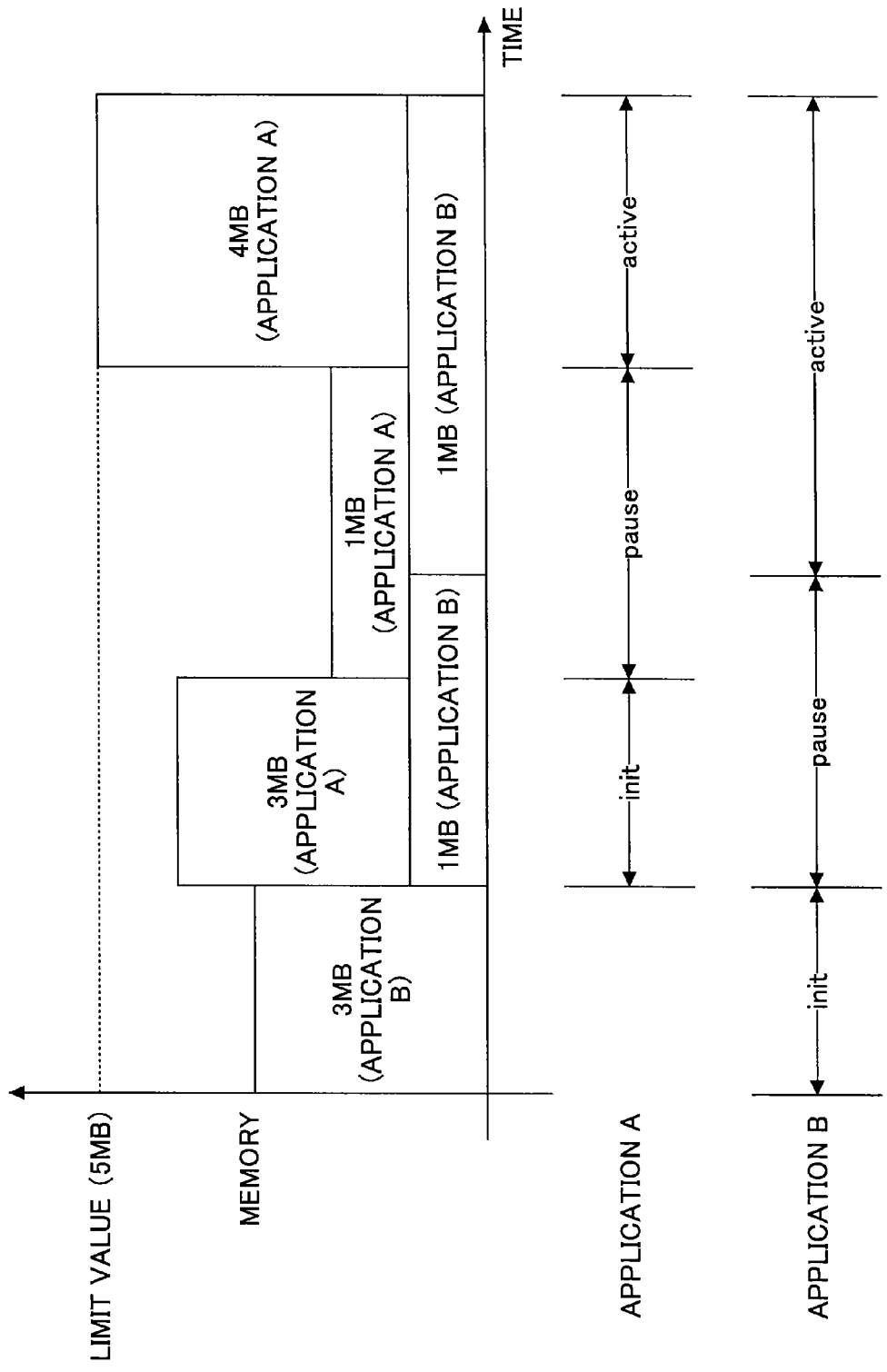
FIG. 21 is a chart illustrating how the memory usage is properly managed by restringing state transitions.

As described with reference to FIG. 20, it is possible to avoid the situation illustrated in FIG. 18C by restricting state transitions of applications. The example of FIG. 18C is improved as described below. FIG. 21 is a chart illustrating how the memory usage is properly managed by restringing state transitions.

In FIG. 21, if both the application A and the application B are in the init state, the sum of maximum memory usage of the application A and the application B exceeds the limit value (5 MB). Therefore, the application A is moved to the init state after moving the application B to the pause state. Thus, the sum of the memory usage is maintained equal to or less than the limit value throughout the process.

As described above, according to the multifunction machine 10 of the second embodiment, even if plural applications operate in parallel, the action (behavior) of the applications can be controlled based on the information in the provisional activation log 80 that has been recorded during provisional activation of the applications. That is, the sum of the maximum memory usage of each application can be maintained equal to or less than the predetermined limit value. Therefore, it is possible to reduce the risk of malfunction due to the applications.

Note that in the example of the second embodiment it is determined during provisional activation whether the maximum memory usage throughout the states is equal to or less than the limit value. Therefore, the processing procedure of FIG. 20 is described on the premise that only applications that satisfy this condition are to be fully activated. In an alternative embodiment, upon fully activating an application, the SAS manager 31 determines the maximum memory usage of the application throughout the states by reference to the provisional activation log 80 of the application and rejects full activation of the application if the maximum memory usage is greater than the limit value. In this case, determination of the maximum memory usage does not necessarily performed during provisional activation. That is, the description "log. Maxmem≤5 MB" in the description 713 of the main script 71a may be removed.

In an alternative embodiment, the processing of FIG. 20 may be performed by the JSDK platform 40.

In the above description, provisional activation is used for previously determining the adequacy of an application. However, provisional activation may be used for other purposes. For example, provisional activation may be used for analyzing the cause of a failure during full activation of an application. In the following examples, provisional activation is used for failure cause analysis according to a third embodiment and a fourth embodiment.

Figure 22:
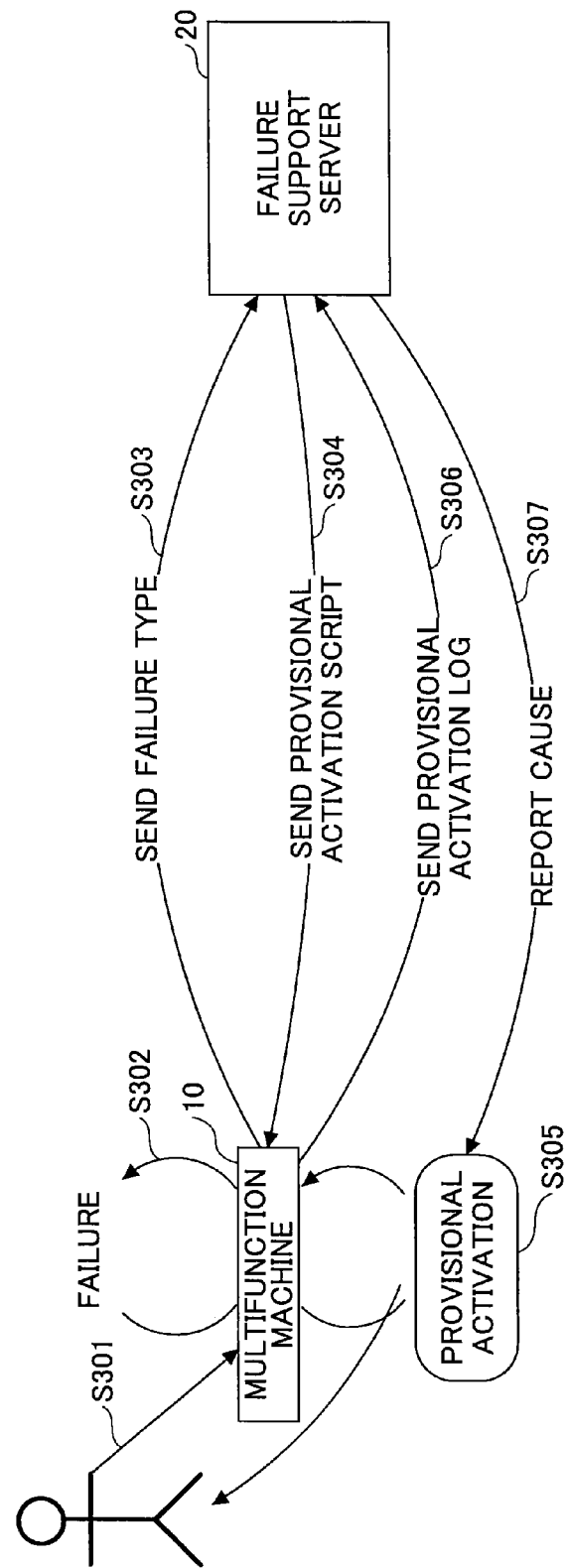
FIG. 22 is a diagram illustrating a method of failure analysis using provisional activation according to a third embodiment.

FIG. 22 is a diagram illustrating a method of failure analysis using provisional activation according to the third embodiment. In FIG. 22, a failure support server 20 is a computer connected to the multifunction machine 10 via a network such as the Internet to monitor the multifunction machine 10 from a remote location. The failure support server 20 may be operated by the vendor of the multifunction machine 10.

In response to an instruction from an operator, the SAS manager 31 of the multifunction machine 10 fully activates an application (e.g., the scan application 321) (Step S301). If a failure occurs during full activation of the application, the panel service 332 displays a warning screen reporting the occurrence of failure (Step S302). Then the SAS manager 31 sends information (e.g., an error code) indicating the type of the failure to the failure support server 20 (Step S303). Based on the information indicating the type of the failure, the failure support server 20 sends a provisional activation script 70 suitable for investigating the cause of the failure to the multifunction machine 10 (Step S304). For example, in a memory unit of the failure support server 20, a provisional activation script 70 for investigating the cause of failure is previously stored for each application and for each failure type. The provisional activation script 70 suitable for investigating the cause of the failure may include a scenario script 72 defining a scenario for analyzing the failure and an action script 73 defining the content of emulation suitable for analyzing the failure.

The multifunction machine 10 provisionally activates the failed application using the received provisional activation script (Step S305). The procedure used in Step S305 is the same as that described in connection with FIG. 7. As a result, a provisional activation log 80 is generated. The SAS manager 31 of the multifunction machine 10 sends the provisional activation log 80 to the failure support server (Step S306).

The failure support server 20 analyzes the provisional activation log 80 to identify the cause of the failure. The cause of the failure may be identified automatically or manually. After the cause is identified, the result of the failure analysis is reported to the operator (Step S307). The result may automatically be sent by e-mail or the like. If the failure is caused by a bug, a modified version may be remotely installed into the multifunction machine 10 from the failure support server 20.

Alternatively, the provisional activation script 70 for each failure type may previously be stored in the multifunction machine 10 so that the multifunction machine 10 performs cause analysis. In this case, the failure support server 20 is not necessarily needed.

The fourth embodiment is described below. FIG. 23 is a diagram illustrating a method of failure analysis using provisional activation according to the fourth embodiment. In FIG. 23, the same elements as those shown in FIG. 22 are indicated by the same reference numerals. In the fourth embodiment, the failure support server 20 includes a JSDK application 30, a JSDK platform 40, and a request path control unit 50.

In FIG. 23, Steps S401-S403 are the same as Steps S301-S303 of FIG. 22.

Based on information indicating the type of the failure, the failure support server 20 selects a provisional activation script 70 suitable for investigating the cause of the failure from the memory unit (Step S404). The failure support server 20 provisionally activates the failure application using the received provisional activation script 70 to generate a provisional activation log 80. Then the failure support server 20 analyzes the provisional activation log 80 to identify the cause of the failure (Step S405). After the cause is identified, the failure support server 20 reports the result of the failure analysis to the operator (Step S406). If the failure is caused by a bug, a modified version may be remotely installed into the multifunction machine 10 from the failure support server 20.

As described above, provisional activation of an application is performed based on the provisional activation script 70 corresponding to the failure to generate a provisional activation log 80, so that a cause analysis can properly be performed based on the provisional activation log 80.

While the present invention is described in terms of preferred embodiments, variations and modifications may be made without departing from the scope of the invention as set forth in the accompanying claims.

What is claimed is:

1. An apparatus which executes a state of transition of a plurality of installed applications, comprising:
   a memory that stores the plurality of installed applications and corresponding provisional activation logs recorded during provisional activation of each of the plurality of installed applications, wherein each of the provisional activation logs includes operational information regarding a consumption of predetermined resource by an installed application of the plurality of installed applications in each of a plurality of states of the installed application; and
   processing circuitry configured to
      execute each of the plurality of installed applications;
      detect a first application of the plurality of installed applications that requires a state transition from one of a plurality of states to another one of the plurality of states during execution of the first application of the plurality of installed applications, wherein the plurality of states includes at least all of an initial state, a pause state, an active state, and a termination state applications;
      determine in response to the detection of the first application of the plurality of installed applications that requires state transition and based on the provisional activation logs associated with each of the plurality of installed applications, whether a sum of an amount of consumption of the predetermined resource by the first application of the plurality of installed applications in a destination state and an amount of consumption of the predetermined resource by other installed applications in their current states after the state transition of the first application of the plurality of installed applications to the destination state is performed is less than or equal to a predetermined limit value; and
      prevent performance of the state transition of the first application of the plurality of installed applications to the destination state during the execution of the first application of the plurality of installed applications when the sum is determined as exceeding the predetermined limit value, and to allow performance of the state transition of the first application of the plurality of installed applications to the destination state during the execution of the first application of the plurality of installed applications when the sum is determined as being less than or equal to the predetermined limit value.

2. The apparatus according to claim 1, wherein, when the sum is determined as exceeding the predetermined limit value, the processing circuitry stops the state transition of the first application of the plurality of installed applications to the destination state, and registers, in a state transition waiting queue, waiting information that indicates the first application of the plurality of installed applications is in a waiting state.

3. The apparatus according to claim 2, wherein the waiting information includes first identification information that identifies the first application of the plurality of installed applications and second identification information that identifies the destination state of the first application of the plurality of installed applications.

4. The apparatus according to claim 3, wherein the waiting information includes a maximum amount of consumption of the predetermined resource by the first application of the plurality of installed applications in the destination state, instead of the second identification information.

5. The apparatus according to claim 1, wherein the processing circuitry is configured to record log information associated with the plurality of installed applications.

6. The apparatus according to claim 1,
wherein the processing circuitry is configured to
record, in response to consumption of the predetermined resource in the apparatus by the plurality of installed applications according to first activation and prior to second activation to perform a function of the apparatus by the plurality of applications, content of the consumption of the predetermined resource as log information for the provisional activation logs.

7. A method executable by an apparatus which executes a state of transition of a plurality of installed applications, the method comprising:
storing, in a memory, that stores the plurality of installed applications and corresponding provisional activation logs recorded during provisional activation of each of the plurality of installed applications, wherein each of the provisional activation logs includes operational information regarding a consumption of predetermined resource by an installed application of the plurality of installed applications in each of a plurality of states of the installed application;
executing each of the plurality of installed applications;
detecting a first application of the plurality of installed applications that requires a state transition from one of a plurality of states to another one of the plurality of states during execution of the first application of the plurality of installed applications, wherein the plurality of states includes at least all of an initial state, a pause state, an active state, and a termination state;
determining in response to the detection of the first application of the plurality of installed applications that requires state transition and based on the provisional activation logs associated with each of the plurality of installed applications, whether a sum of an amount of consumption of the predetermined resource by the first application of the plurality of installed applications in a destination state and an amount of consumption of the predetermined resource by other installed applications in their current states after the state transition of the first application of the plurality of installed applications to the destination state is performed is less than or equal to a predetermined limit value; and
preventing performance of the state transition of the first application of the plurality of installed applications to the destination state during the execution of the first application of the plurality of installed applications when the sum is determined as exceeding the predetermined limit value, and to allow performance of the state transition of the first application of the plurality of installed applications to the destination state during the execution of the first application of the plurality of installed applications when the sum is determined as being less than or equal to the predetermined limit value.

8. The method according to claim 7, wherein the controlling includes stopping the state transition of the first application of the plurality of installed applications to the destination state when the sum is determined as exceeding the predetermined limit value, and registering, in a state transition waiting queue, waiting information that indicates the first application of the plurality of installed applications is in a waiting state.

9. The method according to claim 8, wherein the waiting information includes first identification information that identifies the first application of the plurality of installed applications and second identification information that identifies the destination state of first application of the plurality of installed applications.

10. The method according to claim 9, wherein the waiting information includes a maximum amount of consumption of the predetermined resource by the first application of the plurality of installed applications in the destination state, instead of the second identification information.

11. The method according to claim 7, further comprising: recording log information associated with the plurality of installed applications.

12. The method according to claim 7, further comprising:
recording, in response to consumption of the predetermined resource in the apparatus by the plurality of installed applications according to first activation and prior to second activation to perform a function of the apparatus by the plurality of applications, content of the consumption of the predetermined resource as log information for the provisional activation logs.

13. A non-transitory computer readable medium that stores a computer program for being executed on an apparatus, which executes a state of transition of a plurality of installed applications, to perform a method, the method comprising:
storing, in a memory, that stores the plurality of installed applications and corresponding provisional activation logs recorded during provisional activation of each of the plurality of installed applications, wherein each of the provisional activation logs includes operational information regarding a consumption of predetermined resource by an installed application of the plurality of installed applications in each of a plurality of states of the installed application;
executing each of the plurality of installed applications;
detecting a first application of the plurality of installed applications that requires a state transition from one of a plurality of states to another one of the plurality of states during execution of the first application of the plurality of installed applications, wherein the plurality of states includes at least all of an initial state, a pause state, an active state, and a termination state;
determining in response to the detection of the first application of the plurality of installed applications that requires state transition and based on the provisional activation logs associated with each of the plurality of installed applications, whether a sum of an amount of consumption of the predetermined resource by the first application of the plurality of installed applications in a destination state and an amount of consumption of the predetermined resource by other installed applications in their current states after the state transition of the first application of the plurality of installed applications to the destination state is performed is less than or equal to a predetermined limit value; and preventing performance of the state transition of the first application of the plurality of installed applications to the destination state during the execution of the first application of the plurality of installed applications when the sum is determined as exceeding the predetermined limit value, and to allow performance of the state transition of the first application of the plurality of installed applications to the destination state during the execution of the first application of the plurality of installed applications when the sum is determined as being less than or equal to the predetermined limit value.

* * * * *